United States Patent [19]

Cray et al.

[11] Patent Number: 5,349,677
[45] Date of Patent: Sep. 20, 1994

[54] APPARATUS FOR CALCULATING DELAY WHEN EXECUTING VECTOR TAILGATING INSTRUCTIONS AND USING DELAY TO FACILITATE SIMULTANEOUS READING OF OPERANDS FROM AND WRITING OF RESULTS TO SAME VECTOR REGISTER

[75] Inventors: Seymour R. Cray; James R. Bedell; Dennis W. Kuba, all of Chippewa Falls; William T. Moore, Jr., Elk Mound, all of Wis.

[73] Assignee: Cray Research, Inc., Eagan, Minn.

[21] Appl. No.: 683,095

[22] Filed: Apr. 10, 1991

Related U.S. Application Data

[63] Continuation of Ser. No. 192,210, May 10, 1988, abandoned.

[51] Int. Cl.⁵ .......................... G06F 9/312; G06F 9/34
[52] U.S. Cl. ........................... 395/800; 395/375;
364/736; 364/937.1; 364/937.7; 364/948.3;
364/948.31; 364/948.34; 364/DIG. 2;
364/232.21; 364/251; 364/251.3; 364/258;
364/263; 365/189.05; 365/230.05
[58] Field of Search ............... 395/800, 375; 364/736;
365/189.05, 230.05

[56] References Cited

U.S. PATENT DOCUMENTS

| | | | |
|---|---|---|---|
| 4,656,614 | 4/1987 | Suzuki | 365/230.05 |
| 4,674,032 | 6/1987 | Michaelson | 364/200 |
| 4,720,780 | 1/1988 | Dolecek | 364/200 |
| 4,766,535 | 8/1988 | Auerbach et al. | 364/200 |

FOREIGN PATENT DOCUMENTS 0235977  9/1987  European Pat. Off. .

*Primary Examiner*—Thomas C. Lee
*Assistant Examiner*—Paul Harrity
*Attorney, Agent, or Firm*—Daniel J. Kluth; Thomas F. Brennan

[57] ABSTRACT

Improved performance is obtained in computers of the type having vector registers which communicate with one or more functional units and common memory. As elements of a vector are read from a vector register for transmission to common memory or as operands to a functional unit, the vector register immediately becomes available to receive and store elements of a vector from common memory or a functional unit. The element-by-element storing takes place simultaneously with the element-by-element reading, and trails the reading by at least one element so as to not overwrite elements yet to be read. Through the use of this technique a vector register can be loaded with a vector for a subsequent operation without having to wait for the completion of the previous operation which uses the same vector register.

7 Claims, 20 Drawing Sheets

Vector Address Control

Instruction Issue Timing

Instruction Issue Timing

Vector Register Address
Timing — Part 1

Vector Register Address
Timing — Part 1

Vector Register Address
Timing — Part 2

Vector Register Address
Timing — Part 2

Clear Vector Register Busy Timing

Typical Vector Register

Typical Vector Register

Vector Register Reservation

Vector Address Offset

5,349,677

APPARATUS FOR CALCULATING DELAY WHEN EXECUTING VECTOR TAILGATING INSTRUCTIONS AND USING DELAY TO FACILITATE SIMULTANEOUS READING OF OPERANDS FROM AND WRITING OF RESULTS TO SAME VECTOR REGISTER

This is a continuation, of application Ser. No. 07/192,210 filed May 10, 1988, now abandoned.

FIELD OF THE INVENTION

This invention pertains to the field of high performance vector computers, and in particular to apparatus and methods for controlling the use of vector registers in a process referred to herein as "tailgating" to provide performance gains in vector computations.

BACKGROUND OF THE PRIOR ART

In the field of large, very high performance computers, usually referred to as supercomputers, a vector processing architecture is usually provided in order to achieve very high data processing rates in computations involving ordered sets of data, or vectors. A very successful supercomputer vector processing architecture is disclosed in U.S. Pat. No. 4,128,880 by Seymour R. Cray and assigned to Cray Research, Inc. In that architecture, a plurality of vector registers are provided to hold vectors for sending as operands to functional units, and for receiving and holding result vectors from functional units. For maximum speed, fully segmented functional units are provided wherein all information arriving at the functional unit or moving within the functional unit is captured and held at the end of every time period. Vector registers used as operand registers for a given vector process transmit individual elements to a functional unit at the rate of one element per time period. Once the startup time, or functional unit time, has passed, the functional unit provides successive result elements on successive time periods, and these are transmitted as elements of a result vector to a vector register acting as the result register for that particular vector process. Vector transfers between vector registers and main memory may also be accomplished at one element per time period.

By providing a number of functional units (for example, floating point multiply, integer add, logical operations, etc.) and a number of vector registers (for example, eight), any of which may be associated by program instruction control with any functional unit or memory, computers according to U.S. Pat. No. 4,128,880 may have numerous vector processes proceeding simultaneously, thereby achieving extremely high data processing rates.

SUMMARY OF THE INVENTION

The present invention provides further improvements in processing speed for vector register computers of the type described above through a technique referred to herein as tailgating. Briefly stated, tailgating refers to a technique for more efficient utilization of vector registers, wherein a vector may be written into a vector register simultaneously with the reading therefrom of another vector which was previously stored therein. The tailgating vector to be written into the register can come from a functional unit or from common memory. The technique uses reading and writing of one vector element per time period, with the writing occurring one or more elements behind the read operation so as to not overwrite elements which have yet to be read. By this technique a given vector register can be used both as an operand register and a result register for the same vector operation. In other words, a vector register can be loaded with a vector, element by element, while a previously loaded vector is still being used and read from the vector register, element by element. By this technique, a vector instruction in a program which calls for the use of a particular vector register which is involved in a previously issued vector instruction can issue immediately without having to waist for a completion of the earlier vector instruction. Upon the element-by-element read of one vector, each element of the vector register becomes available for an element-by-element write of another vector.

DESCRIPTION OF THE DRAWINGS

In the drawings, where like numerals refer to like elements throughout the several views, FIGS. 1A and 1B combined are a detailed block diagram of the computation section of the computer incorporating the prevent invention.

DETAILED DESCRIPTION OF THE PREFERRED EMBODIMENT

In the following detailed description of the preferred embodiments, reference is made to the accompanying drawings which form a part hereof, and in which is shown by way of illustration two specific embodiments in which the invention may be practiced. Both embodiments are described in terms of block diagrams and timing diagrams, upon which detailed logic designs (not shown) could be based, as is generally known in the art. It is to be understood that other embodiments may be utilized and that structural changes may be made without departing from the scope of the present invention.

The configuration and operation of the vector processing and control means according to the present invention can best be understood by beginning with a general description of the organization of a computer system employing the present invention. Details of the configuration and operation of the invention will then be presented.

Figure 1A:
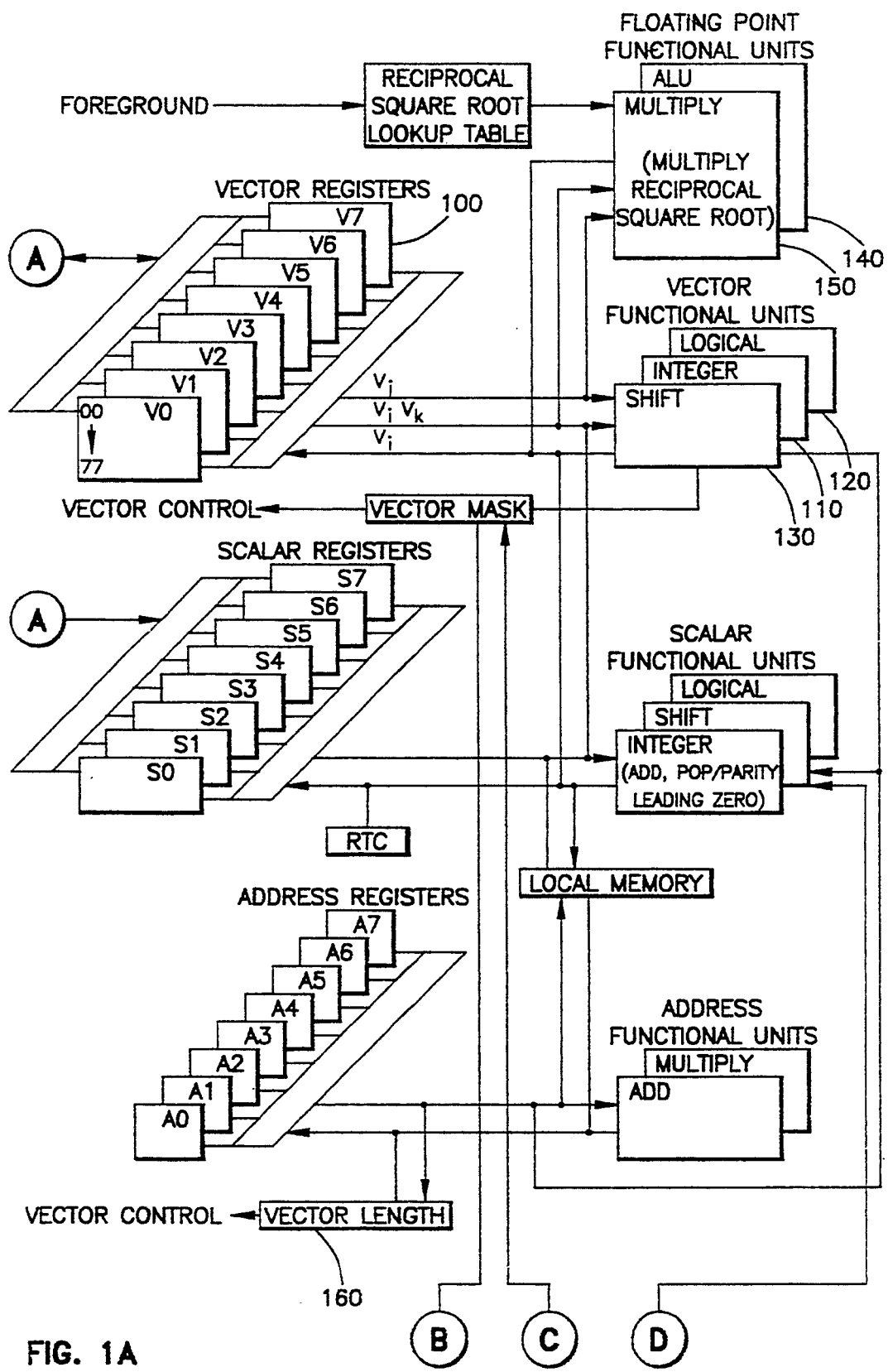
Figure 1B:
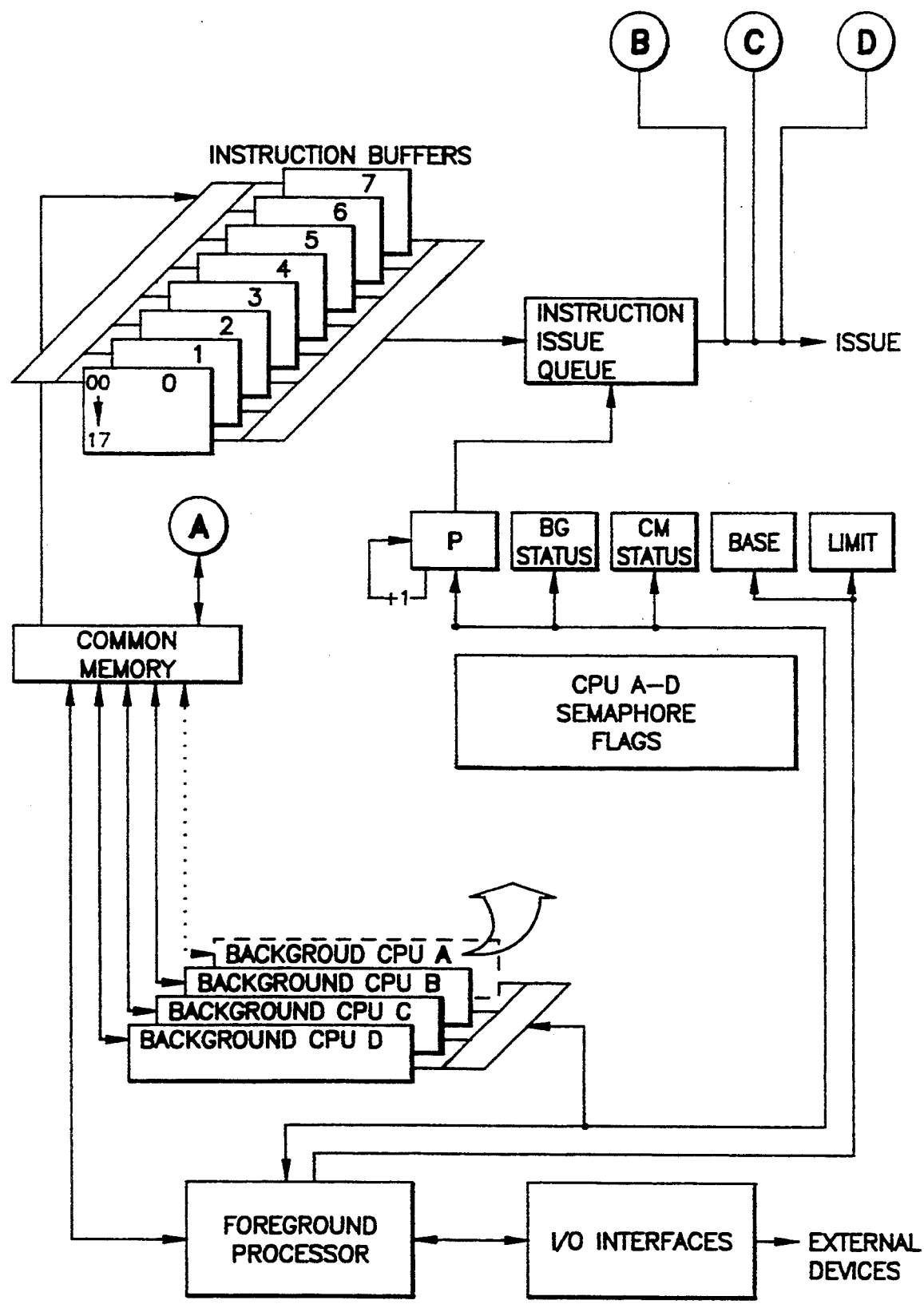

In the block diagram of FIGS. 1A and 1B, the computation section of a computer system is shown in detail. The computation section includes a set of vector registers generally designated by reference number 100. The vector registers form the major computational registers of the computer because they provide high speed processing of data. In both preferred embodiments, there are eight individual vector registers, designated as V0 through V7 in FIGS. 1A and 1B. Each vector register consists of 64 individual elements as indicated by the octal designation of elements 00 through 77 on vector register V0. Each element holds a 64 bit word.

Three functional units are dedicated to vector processing. These are the integer unit 110, the logical unit 120 and the shift unit 130. Two additional functional units are shared between the vector and scalar portions of the computer. These are the floating point functional units for addition 140 and multiplication 150.

A vector operation begins by obtaining operands from the first element of one or more vector registers and delivering them to a functional unit. Successive elements are provided in each time period and as each operation is performed, the results are delivered to successive elements of the destination vector register. The vector operation continues until the number of operations performed by the instruction equals the count specified by the contents of a Vector Length register 160.

In symbolic representations of vector operations, including the drawings and specifications herein, vector registers are identified by the subscripts i, j, and k. Subscript i is used to identify the destination vector register. Subscripts j and k are used to identify operand vector registers. For example, $$v_i = v_j + v_k$$

Elements of a vector register are identified with a numeric subscript (e.g., $V4_6$ is element 6 of vector register 4).

An element of a vector register may be transmitted as an operand to a functional unit and then to provide the destination for a result from a previous operation in a subsequent time period. The use of a register as both an operand register and then a destination register allows for the "tailgating" of two or more vector operations together. In this mode, two or more results may be produced per time period. The time period for these vector operations is normally a single system clock period.

Except for this tailgating mode, vector registers are reserved for the period of time in which they are involved in vector operations. Other instructions that require the same vector registers, but which cannot execute in a tailgating mode, will not issue until the previous instruction is completed and the reservation is dropped. However, since all functional units are independent, multiple unrelated vector processing operations can be underway simultaneously using different functional units and different operand and result vector registers.

First Preferred Embodiment

Figure 2A:
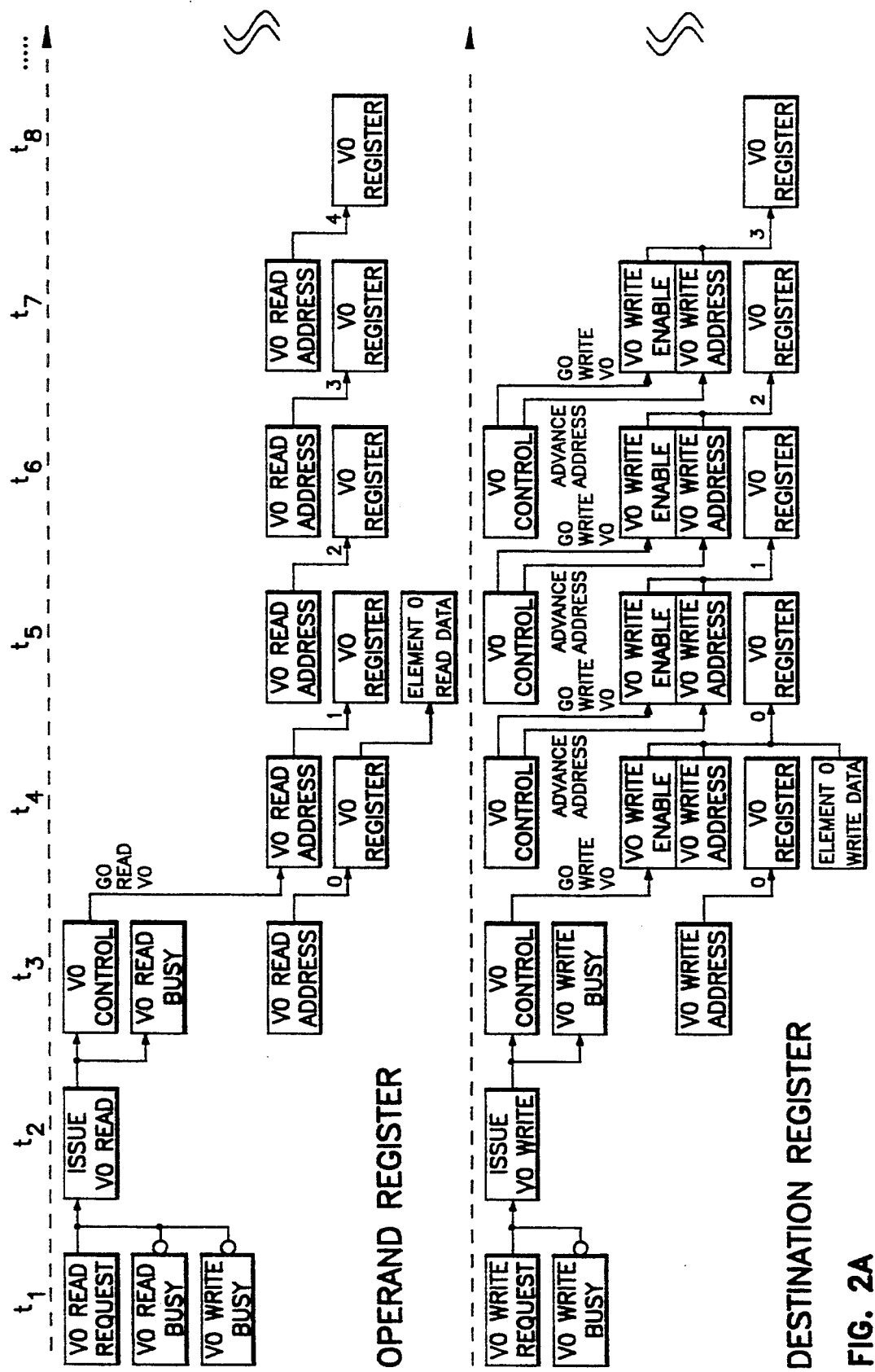
FIGS. 2A and 2B combined are a timing diagram of the tailgating instruction, VO=VO+VO, as executed in the first preferred embodiment.
Figure 2B:
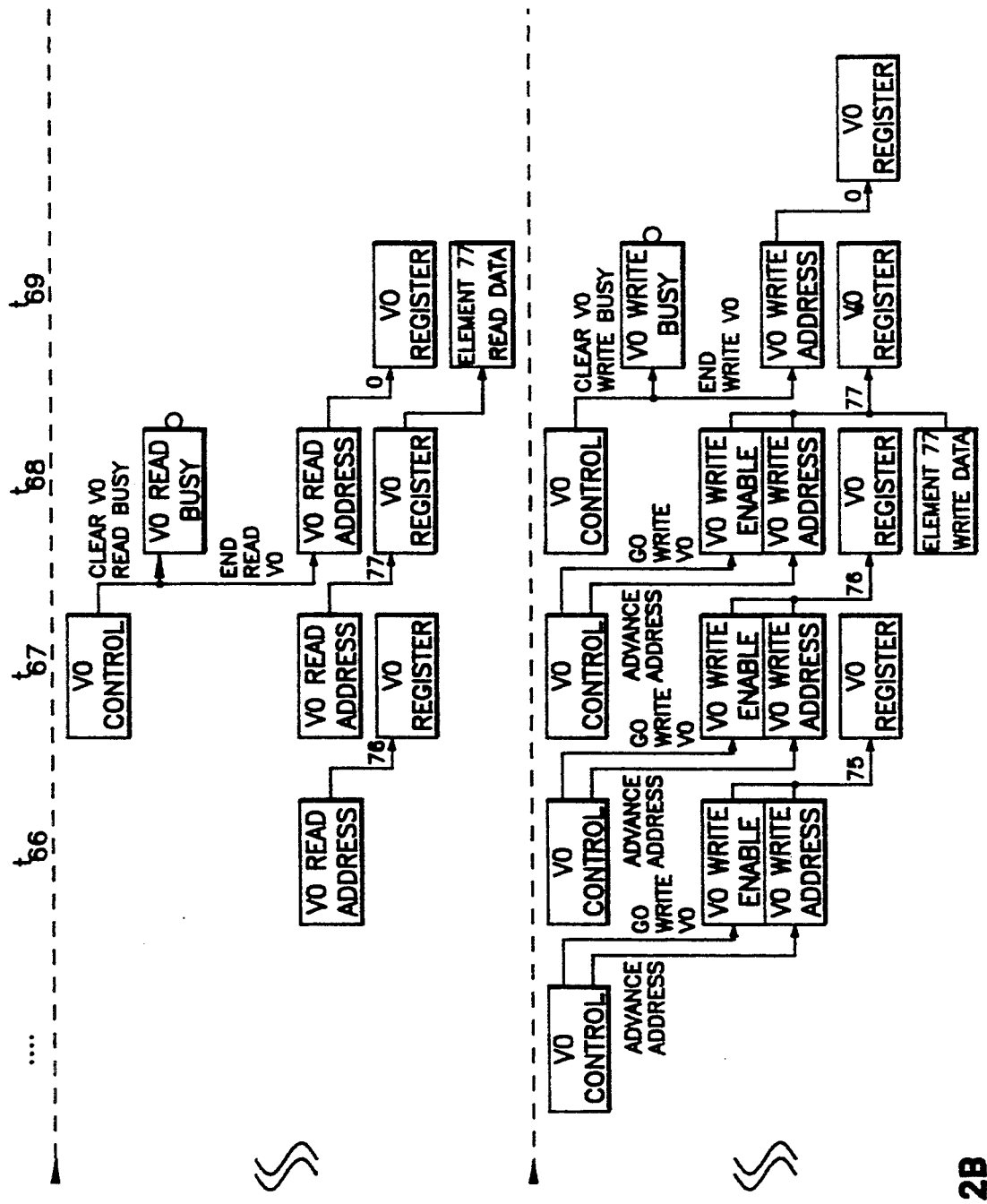
Figure 4:
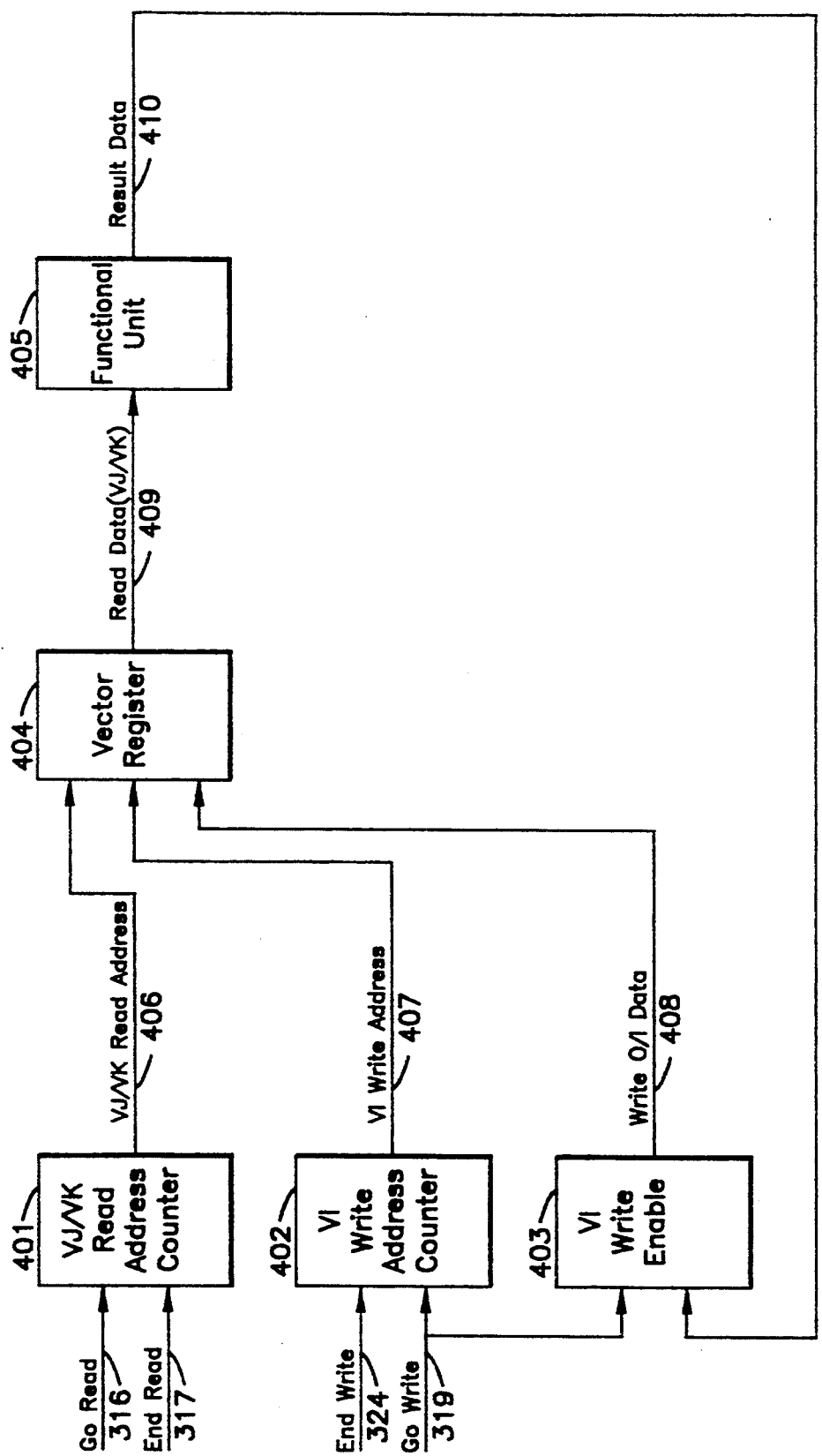
FIG. 4 is a schematic block diagram of the vector register memory for the first preferred embodiment.

The first preferred embodiment of the present invention is illustrated by the drawings in FIGS. 2A, 2B, and 4.

Figure 3:
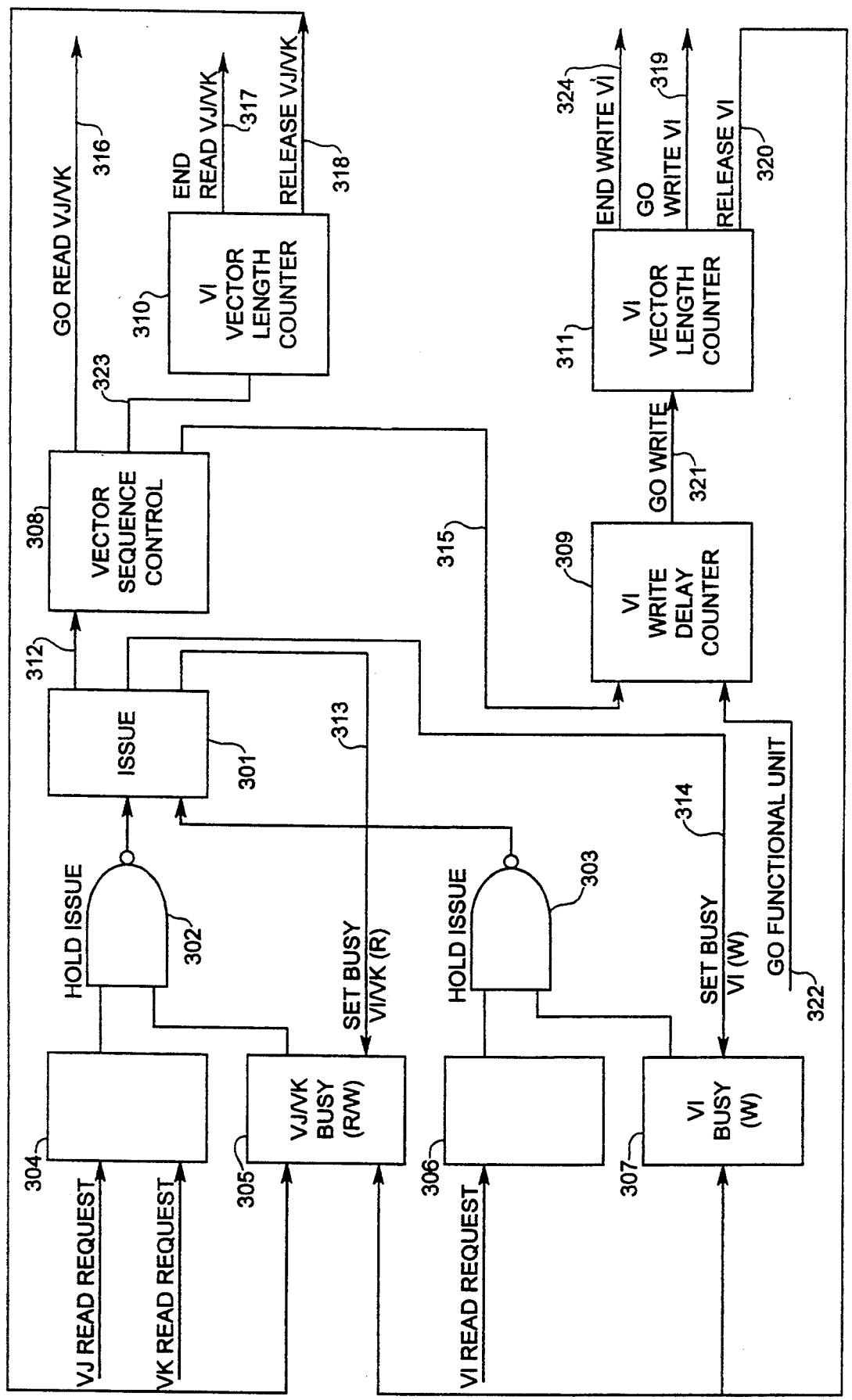
FIG. 3 is a schematic block diagram of the vector register control for the first preferred embodiment.

A schematic block diagram of the Vector Register Control for the first preferred embodiment is shown in FIG. 3. Circuit 301, labelled as Issue, has as its input the complementary output from AND gates 302 and 303. Both outputs are indicators that the instruction must wait before it can issue.

The input to AND gate 302 consists of the output of circuit 305 and the signals $V_j$ Read Request and $V_k$ Read Request held at latch 304. Circuit 305 examines the $V_j$ and $V_k$ Read Busy and Write Busy bits. One Read Busy bit and one Write Busy bit is provided for each vector register. These bits indicate whether the requested operand vector registers are currently busy for a previous Read or Write operation. If the requested operand vector registers are not busy, then the complementary output from AND gate 302 allows the instruction to issue.

The complementary output from AND gate 303 must be examined in conjunction with the complementary output from AND gate 302 before the instruction issue can occur. The input to AND gate 303 is the output from circuit 307 and the signal $V_i$ Write Request held at latch 306. Circuit 307 examines the $V_i$ Write Busy bit to determine whether the requested destination vector register is currently busy for a Write operation. Instruction issue requires that the destination vector register not be busy as a destination for a previous instruction.

When instruction issue does occur, circuit 301 transmits signals on 313 to set $V_j$ Read Busy and $V_k$ Read Busy, and on 314 to set $V_i$ Write Busy. A signal 312 is also transmitted from circuit 301 to the Vector Sequence Control 308. Vector Sequence Control 308, in turn, generates Go Read $V_j$ and Go Read $V_k$ signals 316. These signals act as input to the $V_j/V_k$ Read Address Counter 401 as indicated in FIG. 4. Signal 316 consists of 8 bits-one for each vector register. Signal 316 indicates which of the vector registers is to be used for the Read operations. Typically $V_j$ would be different from $V_k$ during the Read operation. However, since $V_j$ may be the same vector register as $V_k$ in this embodiment, Go Read $V_j$ and Go Read $V_k$ may be the same signal.

Vector Sequence Control 308 also transmits signal 323 to trigger the $V_j/V_k$ Vector Length Counters represented in FIG. 3 by reference numeral 310. Signal 323 consists of 8 bits—one for each Vector Length Counter 310 associated with a vector register. Typically $V_j$ would be different from $V_k$ during the vector read operation. However, since $V_j$ may be the same vector register as $V_k$ in this embodiment, the $V_j$ Vector Length Counter and $V_k$ Vector Length Counter may be the same device.

The $V_j/V_k$ Vector Length Counter 310 is initialized by a processor instruction, Load Vector Length, which is issued by the application software. When $V_j/V_k$ Vector Length Counter 310 decrements to 0, it transmits an End Read $V_j/V_k$ signal 317 that clears $V_j/V_k$ Read Address Counter 401 in FIG. 4. The $V_j/V_k$ Vector Length Counter 310 also transmits a Release $V_j/V_k$ signal 318 to clear the corresponding Read Busy bit.

Vector Sequence Control 308 also transmits signal 315 to activate the $V_i$ Write Delay Counter 309. Signal 315 consists of 8 bits—one for each Write Delay Counter 309 associated with a vector register. The Go Functional Unit signal 322 received by the $V_i$ Write Delay Counter 309 indicates the functional unit being used and the amount of delay required before writing to the destination vector register. The intelligence for determining what functional unit delays are required is contained in the $V_i$ Write Delay Counter 309.

When the $V_i$ Write Delay Counter 309 decrements to 0, it transmits a signal Go Write 321 that triggers 10 the $V_i$ Vector Length Counter 311. The $V_i$ Vector Length Counter 311 transmits a Go Write $V_i$ signal 319 that is input to the $V_i$ Write Address Counter 402 and $V_i$ Write Enable latch 403 in FIG. 4.

The $V_i$ Vector Length Counter 311 is initialized by a processor instruction, Load Vector Length, which is issued by the application software. The Release $V_i$ signal 320 and End Write $V_i$ signal 324 are transmitted by $V_i$ Vector Length Counter 311 when the counter decrements to 0. The Release $V_i$ signal 320 clears the $V_i$ Write Busy bit. Thereafter, another instruction could issue using that vector register. The End Write $V_i$ signal 324 clears $V_i$ Write Address Counter 402 in FIG. 4.

A schematic block diagram of the Vector Register Memory for the first preferred embodiment is shown in FIG. 4. The Vector Register 404 contains 3 inputs: a 6-bit Read Address 406, a 6-bit Write Address 407 and a Write 0/1 signal 408. The Vector Register 404 is unique in that the typical memory device has but 1 address input. This device has 2 distinct address inputs, 1 for Read and 1 for Write. Each register chip is $64 \times 4$ bits. Sixteen such chips make up a vector register of 64 elements each element containing 64 bits.

The $V_j/V_k$ Read Address Counter 401 increments by 1 upon receipt of the Go Read $V_j/V_k$ signal 316 and continues incrementing every time period until it receives the End Read $V_j/V_k$ signal 317. The $V_i$ Write Address Counter 402 increments by 1 at every time period where there is an active Go Write $V_i$ signal 319.

The Go Write $V_i$ signal 319 is also merged with the Result Data 410 at $V_i$ Write Enable 403. This merger creates a Write 0/1 signal 408. This signal 408 is not just a write strobe, but also provides the full 64 bit word which the Vector Register 404 is told to store.

The Read Data 409 from the Vector Register 404 must go to a Functional Unit 405 before it comes back to be written. Therefore, the Read Address 406 is always ahead of the Write Address 407. As long as the Read Address Counter 401 is at least 1 greater than the Write Address Counter 402, the circuit can operate in a tailgating mode.

FIGS. 2A and 2B, which shows a timing diagram of the instruction, VO=VO+VO, will help clarify the concept of tailgating. Gradations along the horizontal axes represent the time unit. The upper half of the diagram represents the control sequence for the operand vector register. The lower half of the diagram represents the control sequence for the destination vector register.

To execute the Add instruction, the operand vector registers must be read and their contents transmitted to the functional unit for processing. In time period t0, a V0 Read Request is signalled. This signal is generated by the instruction decoder before the instruction is issued.

In conjunction with the V0 Read Request signal, two status bits for the desired vector must be examined: a Read Busy bit and a Write Busy bit. When V0 Read Busy and V0 Write Busy indicate that vector register V0 is not being used as an operand nor as a destination, the signal Issue V0 Read is transmitted back to the instruction decoder to allow the instruction to proceed.

To allow vector register V0 to be used as an operand, it must not already be busy either on a Read or Write operation. If another vector register is being used as an operand, the control sequence would look like the upper half of the diagram. However, the diagram is complete for the sequence VO=VO+VO.

In time period t0, a V0 Write Request is also signalled. Vector register V0 provides the destination for the results of the Add instruction. All that need be checked, via the Write Busy bit, is that the vector register is not already a destination for a previous instruction. A signal Issue V0 Write is then transmitted back to the instruction issue control.

In time period t3, instruction issue causes V0 Vector Sequence Control (labeled in the timing diagram as V0 Control) to transmit a signal called Go Read V0 and set V0 Read Busy. V0 Read Address Counter (labeled in the timing diagram as V0 Read Address) has already been initialized for element 0. The Go Read V0 signal causes V0 Read Address Counter to increment at time period t4. Therefore, element 0 is read from the vector register and time period t5 will present the address for element 1. This read and increment operation continues through subsequent time periods until all elements have been read. After all 64 elements have been read at time period t67, V0 Vector Sequence Control will clear V0 Read Busy. An End Read V0 signal is transmitted during the same period to V0 Read Address Counter that resets the element address to 0.

The operands are transmitted to the functional unit. After some period of time, the resulting data is transmitted back to the V0 vector register, its destination. Theoretically, an element which is read from a vector register could be written with new data in the subsequent time period.

Referring to the lower half of FIGS. 2A and 2B, in time period t3 V0 Write Address Counter (labeled in the timing diagram as V0 Write Address) contains element address 0. Instruction issue causes V0 Write Busy to set and V0 Vector Sequence Control transmits a Go Write V0 signal. V0 Write Address Counter remains at element 0 for 2 time periods t3 and t4. As soon as V0 Read Address Counter is 1 and V0 Write Address Counter is 0 (time period t5), element 0 is written with new data. Therefore, there is a 1 time period difference between the Read and the Write operation. Normally, there would be functional unit time between the Read and the Write operations.

Functional unit delay time guarantees that an element being read from will not be written to in the same time period. In FIGS. 2A and 2B, the V0 Write Address Counter is shown being held at element address 0 for 2 time periods. In actuality, $V_i$ Write Address Counter would be held at element address 0 for the number of time periods indicated by $V_i$ Write Delay Counter 309 in FIG. 3.

Once the Write operation begins in time period t5, V0 Write Address Counter advances at every time period in a fashion similar to the V0 Read Address Counter. As each element comes into the destination vector register, it is written into the currently addressed element, which is always at least 1 count behind the address being read. V0 Write Address Counter increments through all 64 elements until time period t68, at which point V0 Vector Sequence Control clears V0 Write Busy and transmits an End Write V0 signal to V0 Write Address Counter that resets the element address to 0.

In this embodiment, common memory can be treated as a functional unit for tailgating purposes. A vector being transmitted from common memory to a vector register can tailgate a vector being used in a previous instruction. Instead of timing the tailgating operation based on functional unit time, the memory transfer time is used.

Second Preferred Embodiment

The second preferred embodiment of the present invention is illustrated by the drawings in FIGS. 5, 6A, 6B, 7A, 7B, 8A, 8B, 9, 10A, 10B, 11, 12, 13 and 14.

Figure 10A:
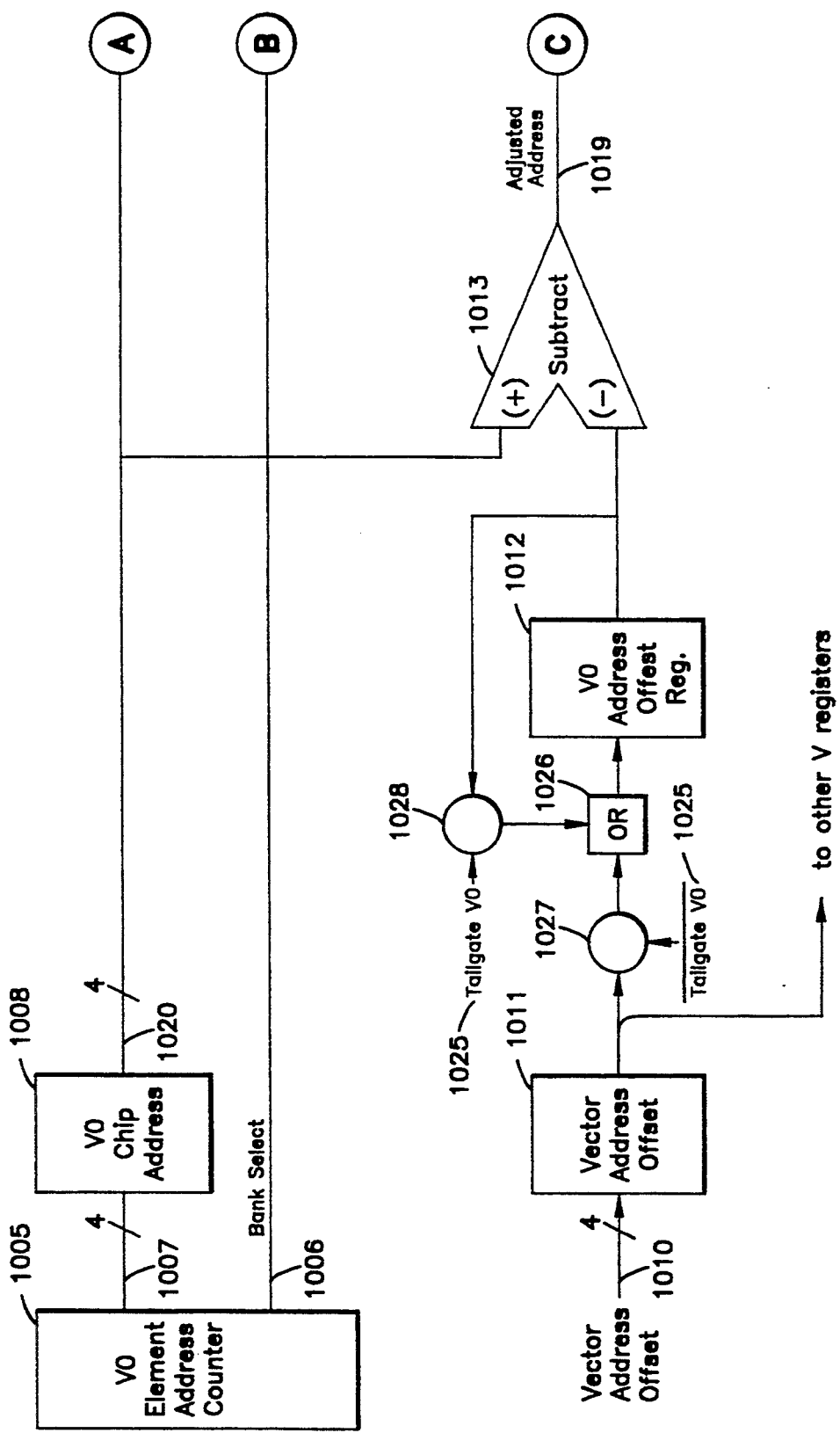
FIGS. 10A and 10B combined are a schematic block diagram of the vector register memory for the second preferred embodiment.
Figure 10B:
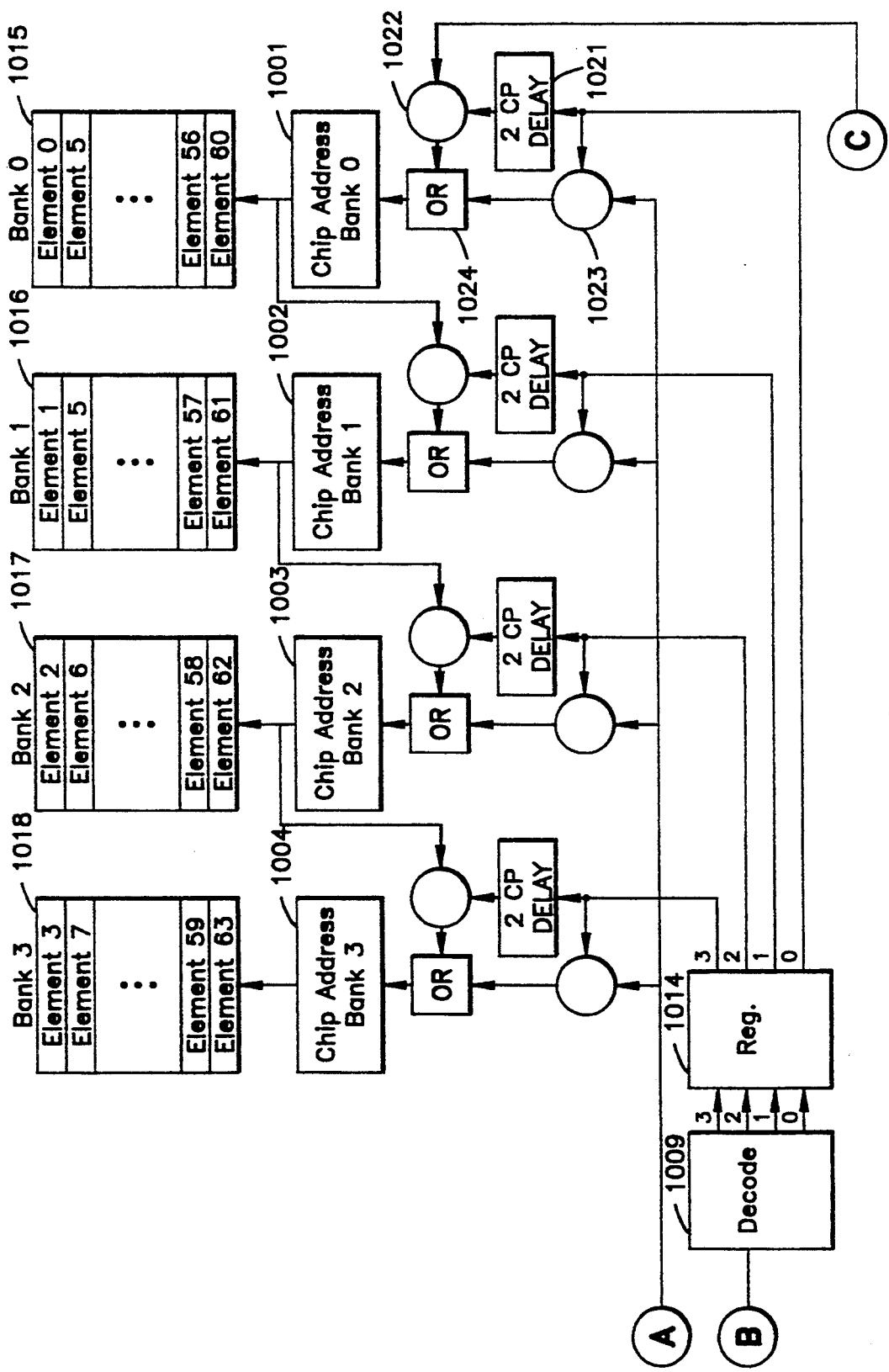

A Vector Register in the second preferred embodiment is separated into 4 banks. As illustrated in FIGS. 10A and 10B, the banks are labeled Bank 0, Bank 1, Bank 2, Bank 3. Each bank gets every fourth element as labeled in FIGS. 10A and 10B: Bank 0 contains element 0, element 4, element 8, etc.

The register chips are a fast 16×4 memory. The cycle time for the register chips is 2 time periods. Each bank of the register is accessed every 4 time periods. Therefore, when not operating in a tailgating mode, a bank is active for 2 time periods and idle for 2 time periods. The sequence 2 time periods active, 2 time periods idle is repeated indefinitely.

Each bank has its own address register, labeled in FIGS. 10A and 10B as the Chip Address 1001 through 1004. The Element Address Counter 1005 is a 6-bit address counter. During register access it counts sequentially, incrementing every time period. The least significant 2 bits of the address are the Bank Select bits 1006. The most significant 4 bits are the Chip Address bits 1007. Chip Address 1008 is simply a register whereby the most significant 4 bits are fanned out to the different banks. The Bank Select Decoder 1009 selects which bank is to be accessed by the Chip Address signals 1020.

In order to do tailgating, to generate the Write Address for the tailgating instruction, the bottom path labeled Vector Address Offset 1010 is used. The Vector Address Offset 1010 is 4 bits. The Vector Address Offset 1010 is sent to the register 1011 at issue time. Register 1011 is fanned out to register 1012 for each vector register via AND gate 1027. Tailgate V0 signal 1025 is also sent at issue time. Once the Tailgate V0 signal 1025 becomes active, the Vector Address Offset is held in the Vector Address Offset Register 1012 associated with the selected vector register via AND gate 1028.

In order to generate the address for the tailgating instruction, the 4-bit output from Chip Address 1008 is run through a Subtractor 1013 to subtract off the Vector Address Offset held at register 1012. The output of the Subtractor 1013 is called the Adjusted Address 1019 and is routed back to Chip Address 1001. This offset relates to the functional unit delay time and the amount of time elapsed between issuing the two instructions involved in the tailgating operation.

Since the bank cycle time is 4 time periods, the element 0 address is stored in Chip Address 1001 during the first 2 time periods. The Adjusted Address 1019 is stored in Chip Address 1001 the last 2 time periods. The subtract need only be executed once for each group of 4 elements. To access subsequent banks the initial Adjusted Address 1019 is transmitted to the next bank's Chip Address. Since an element is written on every time period, a Subtractor is not needed for every bank. The Chip Address is going to be the same for the first four references, then it is incremented by 1 for the next four addresses. The Bank Select bits 1006 provided by the Element Address Counter 1005 determine which bank is selected. One of the necessary conditions for tailgating in the second preferred embodiment is that the vector register be supplied results every single time period in sequence. Operations which do not supply a result every time period in sequence are not allowed to tailgate.

In this embodiment, tailgating is a multiplexing operation. Every two time periods a new address is put into Chip Address 1001 through 1004, first a Read Address, then a Write Address. If the operation is not a tailgating operation, then the sequence is: Read or Write Address for two time periods; "don't care" for two time periods; Read or Write Address for two time periods; etc.

In contrast to the first preferred embodiment, the second preferred embodiment does not contain separate reservation bits for each vector during Read Busy and Write Busy. Instead reservation should be thought of in terms of which one of the two possible bank cycles is being used. There is a reservation flag for the first bank cycle and another reservation flag for the second bank cycle.

Figure 11:
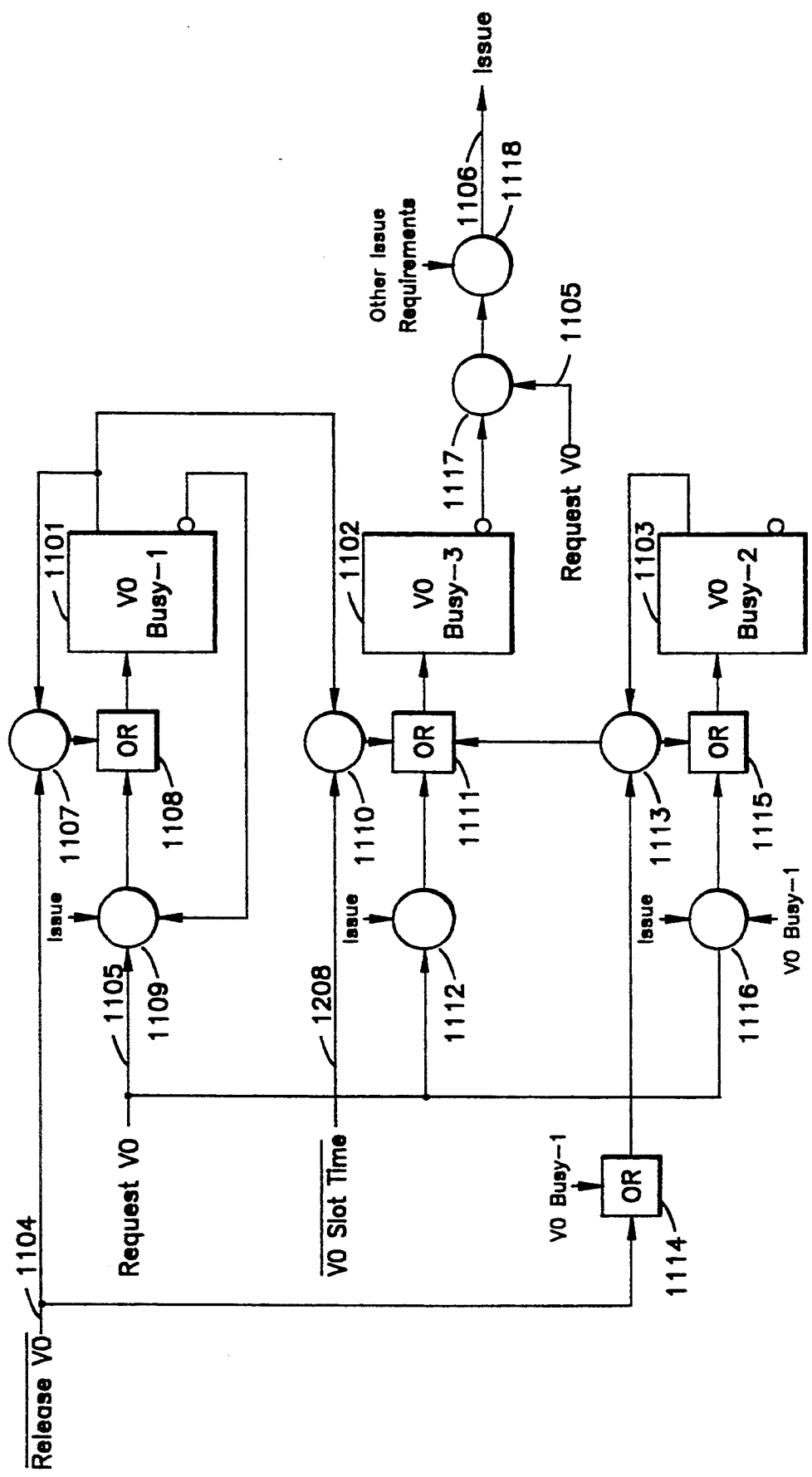
FIG. 11 is a schematic block diagram of the vector register reservation control for the second preferred embodiment.

FIG. 11 shows the Vector Register Reservation circuitry for a single vector register. Three busy flags or reservation flags, labeled as 1101, 1102 and 1103, are shown in the diagram. As mentioned earlier, the cycle time for each vector register bank is two time periods and the bank is accessed every four time periods. During a tailgating operation, the first cycle is a Read and the second cycle is a Write.

Latch 1101, also labeled as V0 Busy-1, is used to indicate that the first two time periods, of a four time period cycle, are reserved. Latch 1103, labeled as V0 Busy-2, is used to reserve the second two time periods. This latch only sets when the vector register is operating in a tailgating mode. Latch 1102, labeled as V0 Busy-3, is a composite used for timing purposes.

V0 Busy-1 1101 sets on a request for the vector register at instruction issue time (assuming V0 Busy-1 1101 is not already set). V0 Busy-2 1103 sets on a request of the vector register at instruction issue time when V0 Busy-1 1101 is already set. V0 Busy-3 1102 is held as long as V0 Busy-1 1101 is set, except when slot time occurs, then V0 Busy-3 clears for one time period. Once V0 Busy-2 1103 is set, it remains set until a Release V0 signal 1104 is received from Vector Address Control. During tailgating, two Release V0 signals 1104 are used. The second release signal will clear V0 Busy-2 1103 while the first clears V0 Busy-1 1101. With both V0 Busy-2 1101 and V0 Busy-2 1103 cleared, V0 Busy-3 1102 will clear as well.

V0 Busy-1 is set at 1108 by the ORed outputs of AND gates 1107 and 1109. AND gate 1107 will hold the contents of V0 Busy-1 until a complement of Release V0 signal 1104 causes it to clear. AND gate 1109 will cause V0 Busy-1 1101 to set at instruction issue time 1106 when Request V0 1105 is signalled and V0 Busy-1 1101 is not in use.

V0 Busy-3 is set at 1111 by the ORed outputs of AND gates 1110, 1112, and 1113. AND gate 1110 has as its input the output from V0 Busy-1 1101 and the complement of the signal V0 Slot Time 1208. AND gate 1112 will set V0 Busy-3 1102 at instruction issue time 1106 when Request V0 1105 is signalled. AND gate 1113 will hold V0 Busy-3 1102 set when V0 Busy-2 1103 is set and either V0 Busy-1 1101 is set or Release V0 1104 is not signalled.

V0 Busy-2 1103 is set at 1115 by the ORed output from AND gates 1116 and 1113. AND gate 1116 will set V0 Busy-2 1103 at instruction issue time 1106 when V0 Busy-1 1101 is set and Request V0 1105 is signalled.

AND gate 1113 holds V0 Busy-2 1103 set when the output from OR gate 1114 is 1. OR gate 1114 has as its input V0 Busy-1 1101 and the complement of the Release V0 signal 1104.

Figure 12:
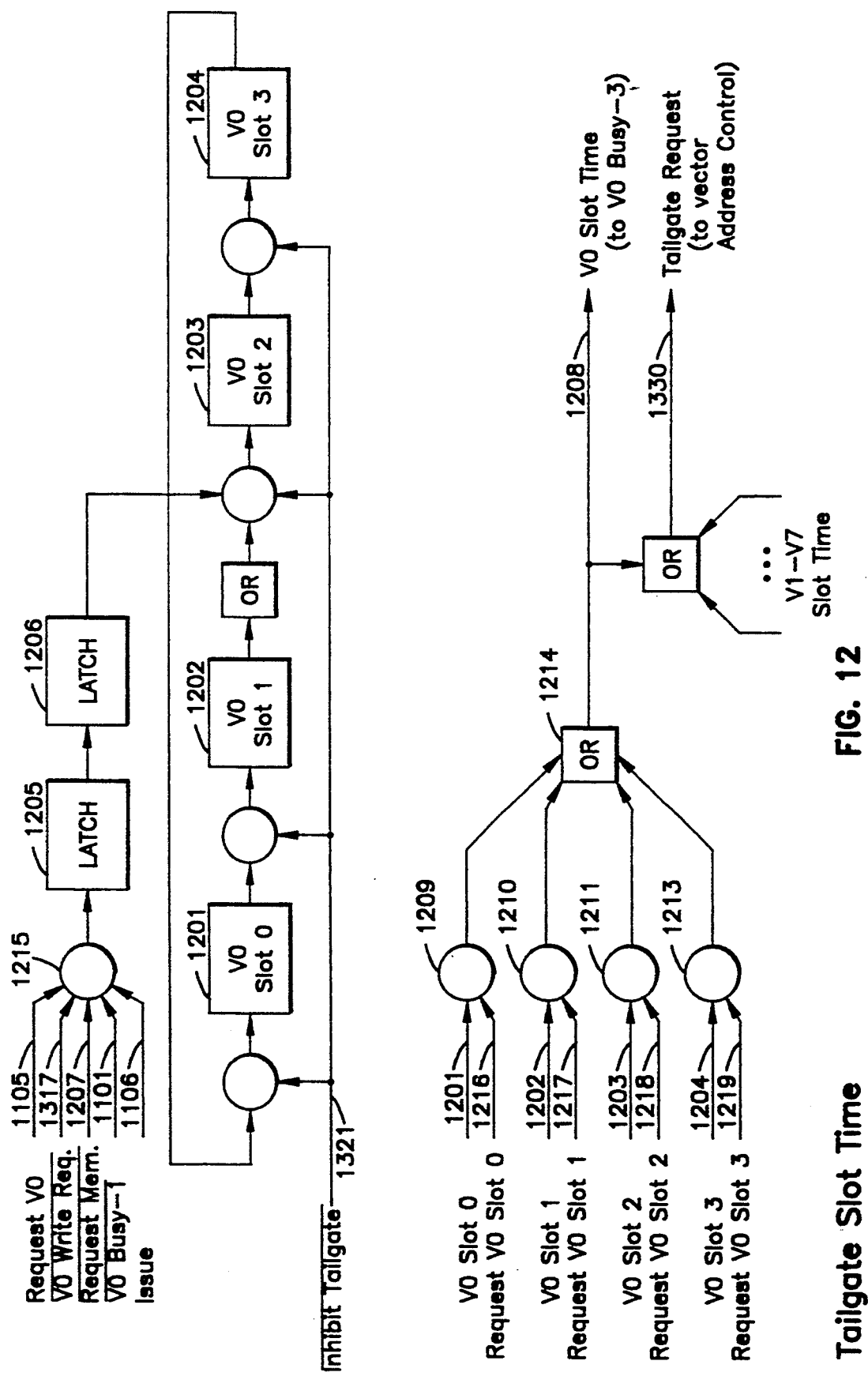
FIG. 12 is a schematic block diagram of the tailgate slot time control for the second preferred embodiment.

FIG. 12 is a schematic diagram describing the Tailgate Slot Time circuitry. Depending on the functional unit time of the tailgating instruction, the instruction must be issued at a time that will sychronize the Write operation with the Read operation currently in progress against the vector register. Four different slots are used to perform the synchronization function using latches 1201, 1202, 1203, and 1204 in FIG. 12. Each slot corresponds to one of four different time periods in a memory cycle.

Two time periods after the first instruction issues, the slot counter, implemented by latches 1201, 1202, 1203, and 1204, begins counting at Slot 2. Latches 1205 and 1206 insure that the succeeding instruction does not issue too soon; a two time period delay is added to the second instruction when tailgating.

The slot counter is set by the output from AND gate 1215. This AND gate 1215 has as its input and combination of signals: Request V0 1105; the complement of V0 Write Request 1317; the complement of Request Memory 1207; the complement of V0 Busy-1 1101; and Issue 1106. The signal Request V0 1105 causes the slot counter to start only when the vector register is initially requested. By using the complement of the signal V0 Write Request 1317, the slot counter is started only if the vector register request is for a Read operation. The complement of the signal Request Memory 1207 prevents tailgating during a common memory operation, a restriction only in the second preferred embodiment. The complement of the signal V0 Busy-1 1101 prevents the slot counter from being re-initialized while it is operating. The signal Issue 1106 allows the slot counter to initialize only at instruction issue time.

After the first instruction has issued, assume the tailgating instruction is in position to be decoded and issued. The tailgating instruction need not be executed immediately after the first instruction; several non-related instructions could be executed between the first instruction and the tailgating instruction. Depending on the instruction type, one of four "request slot" signals (e.g., Request V0 Slot 0 1216) is transmitted by the instruction decoder. For example, a Vector Logical Product instruction requests slot 0. Therefore, in the decode process a Request V0 Slot 0 signal 1216 is transmitted. A different functional unit operation could result in a different slot request to synchronize the Write operations.

Since the signal generated by V0 Busy-3 1102 in FIG. 11 is preventing instruction issue, this signal must be interrupted for one time period for the tailgating instruction to issue. As shown in the bottom half of FIG. 12, the signal Request V0 Slot 0 1216 is ANDed at 1209 with the signal generated by latch 1201, labeled V0 Slot 0, to generate a signal labeled V0 Slot Time 1208. In a similar fashion requests for other slots are ANDed with the output from the corresponding latches 1201, 1202, 1203, or 1204. Any of the resulting signals can set V0 Slot Time 1208 via OR gate 1214.

This V0 Slot Time signal 1208 acts as input to the Vector Register Reservation circuitry in FIG. 11. The complement of the signal V0 Slot Time 1208 is ANDed with the output from V0 Busy-1 1101 at 1110 and then the result is ORed as input to V0 Busy-3 1102 at 1111. The signal transmitted by V0 Busy-3 1102, as indicated above, holds instruction issue. The complementary signal V0 Slot Time 1208 clears V0 Busy-3 1102 for one time period, thereby allowing instruction issue provided there are no other conflicts.

When the tailgating instruction issues, V0 Busy-2 1103 is set through an AND operation at 1116 on the signal Issue 1106 and the output from V0 Busy-1 1101. V0 Busy-2 1103 prevents a subsequent tailgating operation from occurring for the same vector register. The contents of V0 Busy-2 1103 are ANDed with the contents of V0 Busy-1 1101 to provide input to V0 Busy-3 1102, thereby preventing V0 Busy-3 1102 from clearing at the next V0 Slot Time signal 1208.

Figure 13:
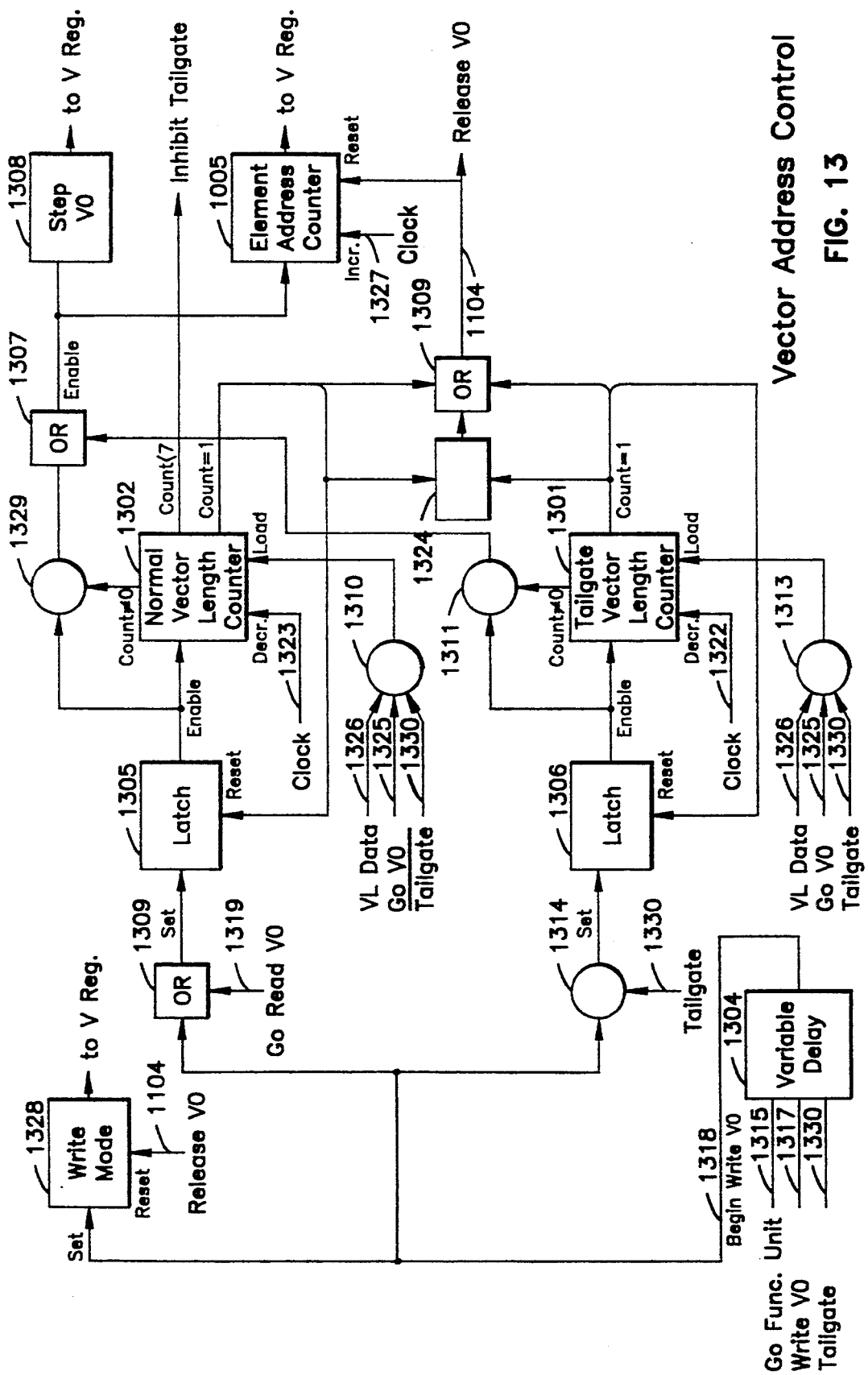
FIG. 13 is a schematic block diagram of the vector address control for the second preferred embodiment.

Referring now to FIG. 13, the Vector Address Control circuit contains an Element Address Counter 1005, a Variable Delay 1304, a Normal Vector Length Counter 1302, and a Tailgate Vector Length Counter 1301.

The Variable Delay 1304 is triggered by the Write V0 signal 1317 generated at instruction issue time. The amount of delay is determined by the Go Functional Unit signal 1315 which indicates which functional unit is used and the Tailgate signal 1330. Different delay values are used for normal vs. tailgating instructions. Upon delaying the proper amount of time, the Variable Delay 1304 transmits a signal Begin Write 1318. The Begin Write signal 1318 sets latch 1328 which in turn transmits the Write Mode signal to the vector register. The Write Mode signal from latch 1328 indicates that the transmitted element address is for a write operation.

The Begin Write signal 1318 is ORed at 1309 with the signal Go Read V0 1319 issued by the instruction decoder. The output from OR gate 1309 sets latch 1305. Thus, latch 1305 sets immediately after issue for a Read operation or after a predetermined delay for a normal Write operation. The output from latch 1305 enables the operation of the Normal Vector Length Counter 1302. When the Normal Vector Length Counter 1302 holds a value of 1, it resets latch 1305, thereby disabling the Normal Vector Length Counter 1302. The normal Vector Length Counter 1302 will have decremented to 0 by the time the enable is dropped.

During a tailgating operation, the Begin Write signal 1318 is ANDed with the Tailgate signal 1330 at 1314. The output from AND gate 1314 sets latch 1306. The output from latch 1306 enables the operation of the Tailgate Vector Length Counter 1301. When the Tailgate Vector Length Counter 1301 holds a value of 1, it resets latch 1306, thereby disabling the Tailgate Vector Length Counter 1301. The Tailgate Vector Length Counter 1301 will have decremented to 0 by the time the enable is dropped.

Both the Normal Vector Length Counter 1302 and the Tailgate Vector Length Counter 1301 transmit the Release V0 signal 1104, via OR gate 1312, when either counter reaches the value of 1. Both counters decrement at every time period as indicated by the inputs 1322 and 1323. Circuit 1324 generates an extra Release V0 signal 1104 if both counters decrement to 1 simultaneously.

The Tailgate Vector Length Counter 1301 is used strictly for tailgating operations. It performs basically the same function as the Normal Vector Length Counter 1302. Note that for the Normal Vector Length Counter 1302, a complement Tailgate signal 1330 loads the counter with the Vector Length Data 1326 at AND gate 1310. In contrast, a Tailgate signal 1330 loads the Tailgate Vector Length Counter 1301 with the Vector Length Data 1326 at AND gate 1313. The Go V0 1325 signal indicates instruction issue at both AND gates 1310 and 1313.

Either Vector Length Counter 1301 or 1302 enables the Element Address Counter 1005 as long as both counts are not 0. The output from the Normal Vector Length Counter 1302 is ANDed with the output from latch 1305 at 1329. The output from Tailgate Vector Length Counter 1301 is ANDed with the output from latch 1306 at 1311. The output from AND gates 1329 and 1311 provide the input to OR gate 1307 which in turn provides the enable signal to both Element Address Counter 1005 and the Step V0 latch 1308. The output from Step V0 1308 indicates to the Vector Register Memory that the Element Address Counter 1005 value is valid.

The Normal Vector Length Counter 1302 transmits the Inhibit Tailgate signal 1321 to the instruction issue control whenever the count is less than the value 7. Signal 1321 is used to prevent problems with issue control. If the read count gets too small, signal 1321 inhibits the initiation of a tailgating instruction. If a tailgating instruction is in progress at the time, it is not affected by signal 1321.

The Element Address Counter 1005 increments on each time period as indicated by input 1327. The Element Address Counter 1005 is cleared by the Release V0 signal 1104. When tailgating, the first Release V0 signal 1104 is ignored by the Element Address Counter 1005.

The enable signal 1307 from the Tailgate Vector Length Counter 1301 can cause the Element Address Counter 1005 to count beyond the length used for the first instruction. This allows the tailgating instruction to write data to the vector register by subtracting the Address Offset from the Element Address Counter 1005 value.

Figure 14:
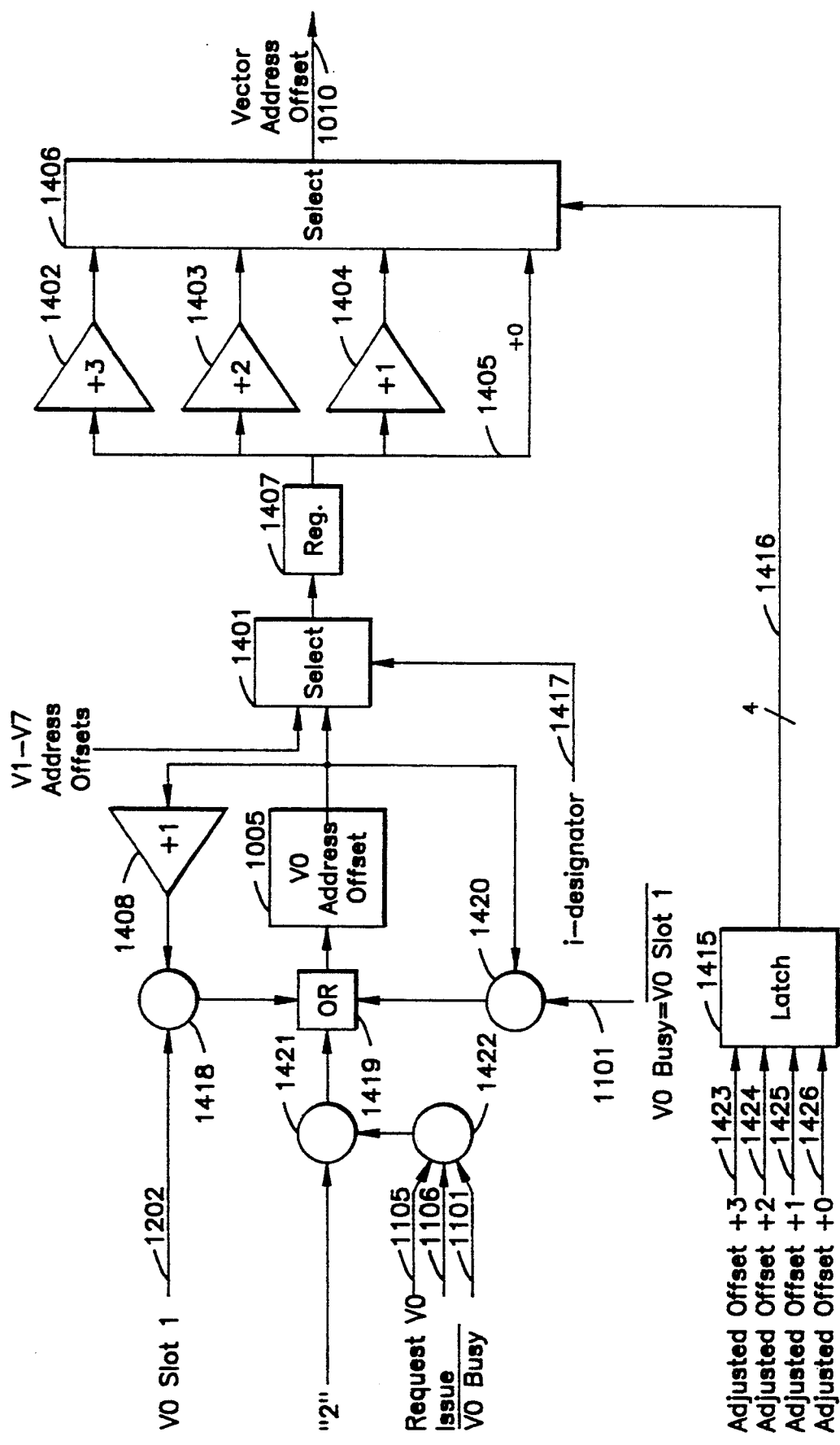
FIG. 14 is a schematic block diagram of the vector address offset control for the second preferred embodiment.

FIG. 14 illustrates the Vector Address Offset circuitry. The 4-bit register V0 Address Offset 1409 is set by OR gate 1419. OR gate 1419 has as its input the output from AND gates 1418, 1420, and 1421. AND gate 1421 initializes the V0 Address Offset register 1409 at instruction issue time. The input to AND gate 1421 is the value 2 which is gated by the output from AND gate 1422. AND gate 1422 has as its input the signals Request V0 1105, Issue 1106, and the complement of V0 Busy-1 1101. Thus, V0 Address Offset 1409 is initialized with the value 2 when a request is made of Vector Register V0, at instruction issue time, and so long as V0 is not already busy.

The contents of V0 Address Offset 1409 are held by the output of AND gate 1420. The other two inputs to AND gate 1420 are the signals V0 Busy-1 1101 and the complement of V0 Slot 1 1202. Therefore, the "wrap around" of V0 Address Offset 1409 occurs while the V0 vector register V0 remains busy and the V0 slot counter does not indicate slot 1.

The value held in V0 Address Offset 1409 is incremented whenever the V0 slot counter indicates slot 1. The AND gate 1418 has as its input the signal V0 Slot 1 1202 and the value from V0 Address Offset 1409 incremented by 1 by the adder 1408.

The Address Offsets for all vector registers are fanned into a single selection network 1401. The desired Address Offset is chosen by the i-designator signal 1417 identifying the destination vector register. The Address Offset is transmitted and held at register 1407. Only one Address Offset need be selected at 1401 because the Vector Address Offset 1010 is only sent at instruction issue time. Subsequently, the value held at Vector Address Offset 1011 is fanned out to all eight vector registers as shown in FIGS. 10A and 10B. The Vector Address Offset Register 1012 (one of eight) is loaded at instruction issue time only if the corresponding Tailgate signal 1025 (one of eight) is present.

The output from register 1407 is delivered to four adders 1402, 1403, 1404, and 1405. The output from these adders provide the input to the selection network 1406. At instruction issue time one of four signals indicates which of the adder outputs to select. These signals are labelled in FIG. 14 as Adjusted Offset +3 1423, Adjusted Offset +2 1424, Adjusted Offset +1 1425, and Adjusted Offset +0 1426. Only one signal is active at any time. The signals are then held in a set of latches 1415 and will control the selection network 1406 via the signal 1416.

The resulting Vector Address Offset 1010, also shown in FIGS. 10A and 10B, is a number that must be subtracted from the Chip Address 1020 to arrive at the Adjusted Address 1019 for the tailgating operation. What is measured by the Adjusted Address 1019 is the amount of time between the issuance of the first instruction and the issuance of the tailgating instruction plus the functional unit delay time of the tailgating instruction. There could be any number of instructions issued in between. As shown in FIG. 14, when the first instruction issues, the Vector Address 1409 is initialized with the value 2 and incremented every 4 time periods by the Slot 1 signal 1202. Eventually the tailgating instruction is issued. At instruction issue time for the tailgating instruction, the Address Offset 1409 is adjusted by the values 0, 1, 2, or 3. This final adjustment depends on the functional unit time of the tailgating instruction.

The timing diagrams of FIGS. 5, 6A, 6B, 7A, 7B, 8A, 8B and 9 will help explain the tailgating invention as implemented in the second preferred embodiment.

Figure 5:
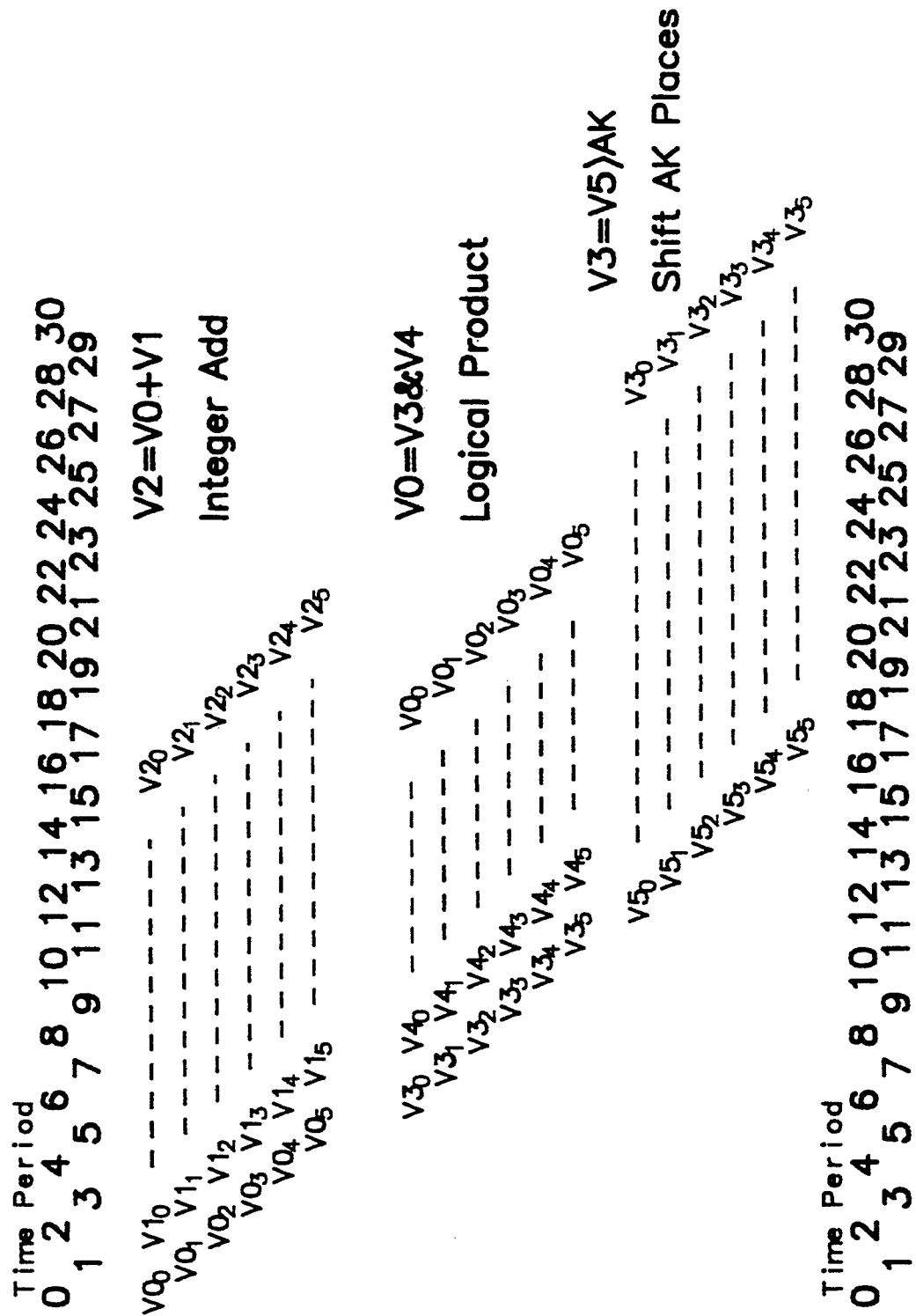
FIG. 5 is a timing diagram of a three instruction tailgating sequence as executed in the second preferred embodiment.

FIG. 5 is a timing diagram illustrating a typical tailgating operation. The diagram shows the second instruction (V0=V3 & V4) tailgating the first instruction (V2=V0+V1), and the third instruction (V3=V5>$A_k$) tailgating the second instruction. In the timing diagram of FIG. 5, the gradations along the horizontal axes represent time periods. The horizontal lines, broken into 3 segments (dashed, solid, dashed) represent the amount of time required to deliver an operand to a functional unit, the number of time periods required by the functional unit, and the number of time periods required to deliver a result to a destination vector respectively. Delivery times may change depending upon whether the functional unit resides on the same module as the vector registers. Such is the case in the second instruction using the Logical functional unit.

At time period t4 in FIG. 5 the vector registers V0 and V1 begin supplying operands to the Integer functional unit. The subsequent lines of FIG. 5 show the cycle through the subsequent elements and instructions. The operands are supplied at a rate of one element per time period.

The results start coming back from the second instruction, the V0 tailgating instruction, at time period t14. Therefore, vector register V0 must be ready for a write operation at time period t14. The first result, element 0, is written during the periods following the read of element 8 for the first instruction. After element 9 is read, element 1 is written. After element 10 is read, element 2 is written. This describes the basic flow of data to and from the vector register V0 during a tailgating operation.

Instruction issue control must examine the tailgating instruction and determine, knowing the amount of delay that a functional unit will cause, which time period the first result will return to be stored in the vector register at element 0. Based on this information, vector register control delays the second instruction until it is in synchronization with the bank cycle of the vector register.

In the second preferred embodiment, the computer, at its fastest, can issue an instruction once every two time periods. In the event of a tailgating instruction, the earliest that the second instruction can issue is time period t5. In the example of FIG. 5, the second instruction is held for one additional time period to make sure it is in synchronization with the bank cycle. This insures that the reading and the writing of vector register elements occur in the correct sequence. FIG. 5 can be described in terms of holding instruction issue to synchronize for tailgating. Without tailgating there would be a register conflict which would cause the second instruction to hold issue until all result elements of the first instruction were stored.

Figure 6A:
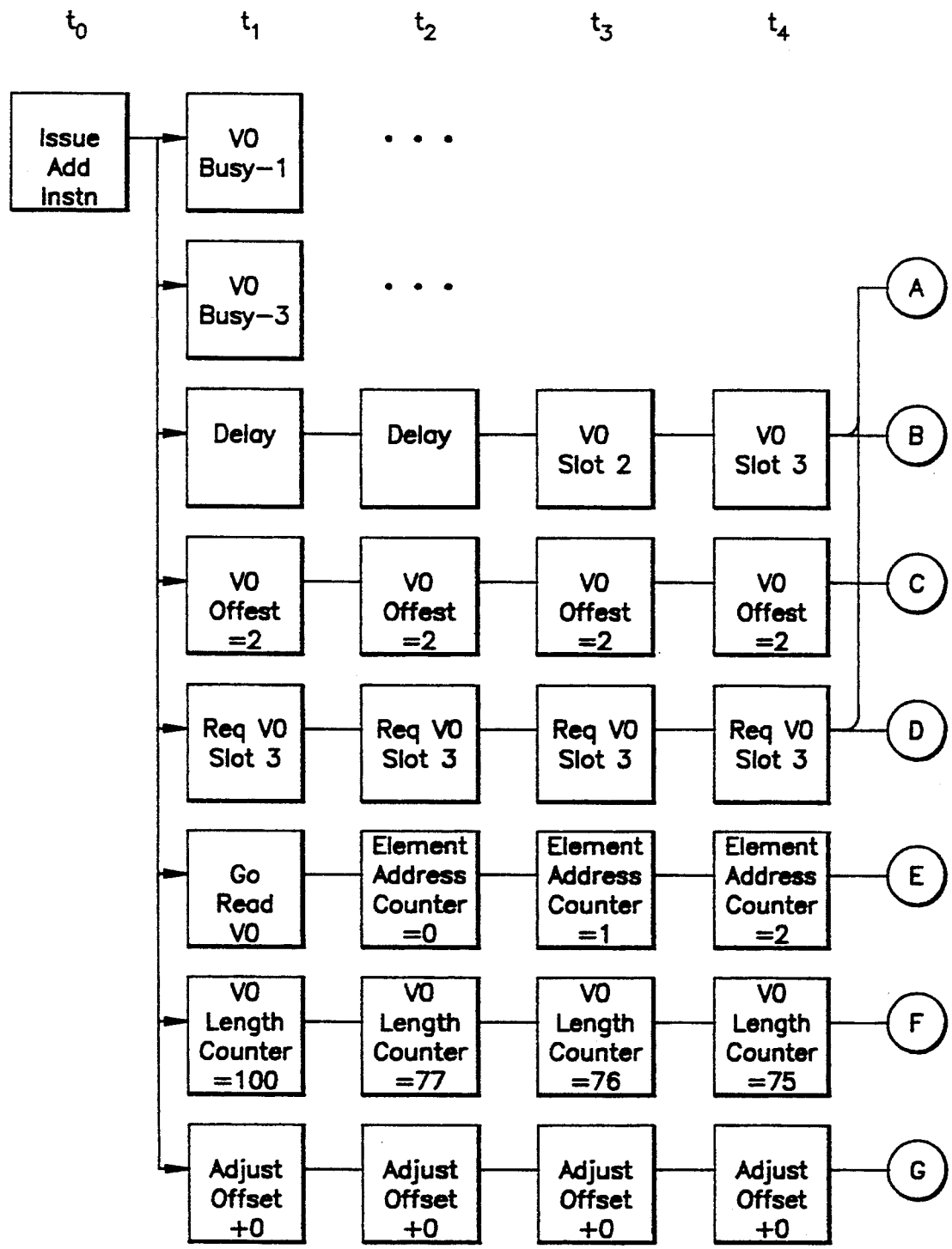
FIGS. 6A, 6B, 7A, 7B, 8A, 8B and 9 combined form a timing diagram further describing the events occurring during the instruction sequence of FIG. 5.
Figure 6B:
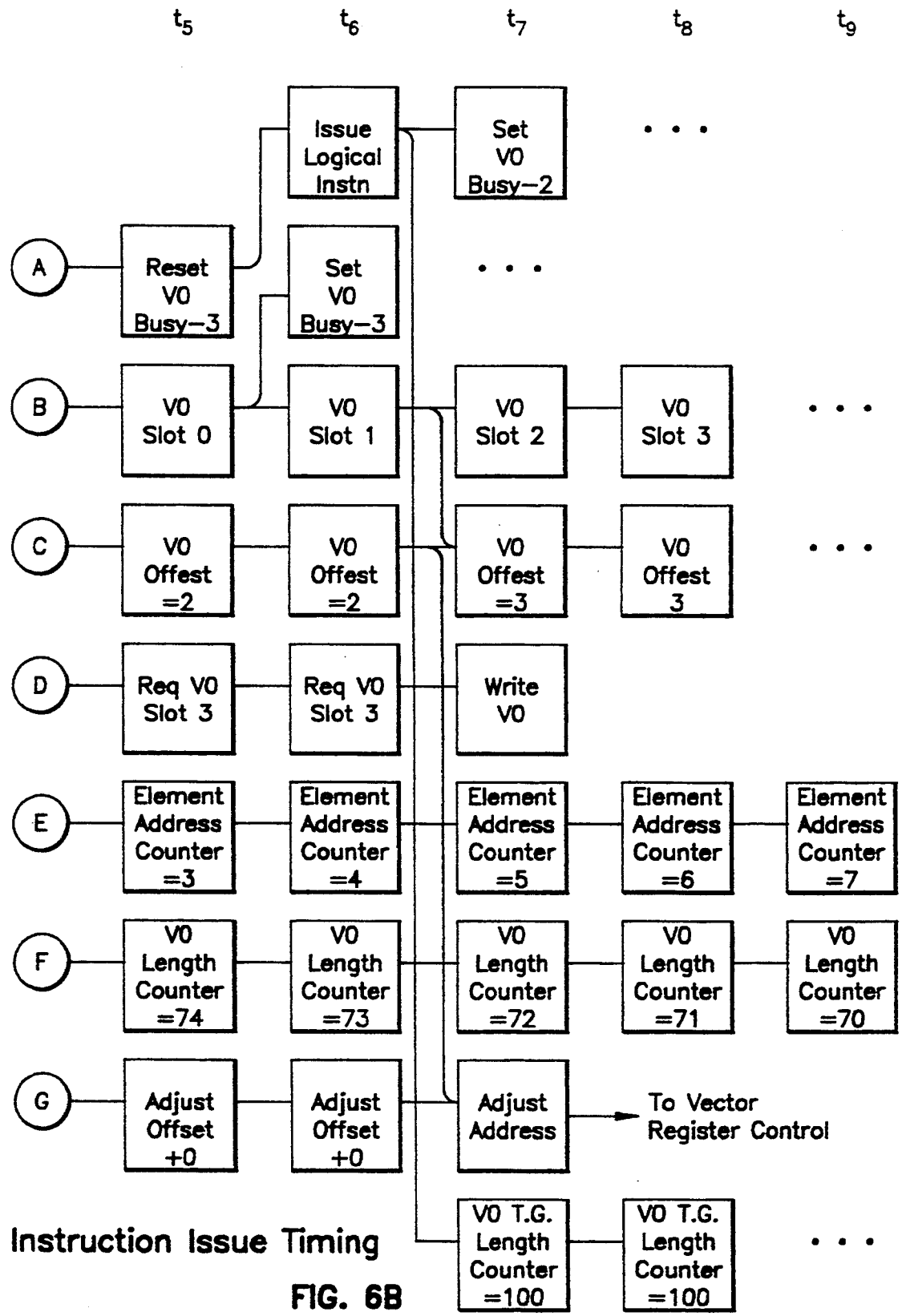

In FIGS. 6A and 6B, the instruction issue timing diagram, at time t0 the Add instruction is issued. The Add instruction sets V0 Busy-1 and V0 Busy-3. Both remain set for the duration of the Add operation, except when V0 Busy-3 clears for a single time period to allow the tailgating instruction to issue. The third line indicates the Tailgate Slot Time operation. Two initial delays occur, then the V0 slot counter begins operating as a ring counter. The fourth line shows the V0 Address Offset. It is always initialized with a value of 2, then every time V0 slot 1 is indicated by the V0 slot counter, the V0 Offset is incremented by 1. The fifth line shows the signal Request V0 Slot 3. The Request V0 Slot 3 signal is generated by the tailgating instruction waiting to be issued. The signal Go Read V0 is generated by the Add instruction and triggers the Element Address Counter (labeled in the timing diagram as V0 Element Address) to read each element in vector register V0. The last line assumes a vector length of 100 (octal) in the Normal Vector Length Counter (labeled in the timing diagram as V0 Length Counter) that decrements as each element is read from the vector register.

At time period t4, V0 Slot 3 is indicated and the signal Request V0 Slot 3 is active. The AND of these two signals causes V0 Busy-3 to clear for a single time period which allows the tailgating instruction to issue provided all other issue conditions are met. Issue of this instruction sets V0 Busy-2, Write V0, and initializes the Tailgate Vector Length Counter (labeled in the timing diagram as V0 T.G. Length Counter) in time period t7. The indication V0 of Slot 0 in time period t5 sets V0 Busy-3 once again and increments the V0 Address Offset by 1 count. Once the second instruction has issued, the adjusted V0 Address Offset is transmitted to the vector registers. The adjustment occurs in the same time period as instruction issue. Thus, the V0 Address Offset used for the Adjusted Address is the V0 Address Offset from the previous time period containing the value 2. From this point on the slot counter and the V0 Address Offset are not important.

Figure 7A:
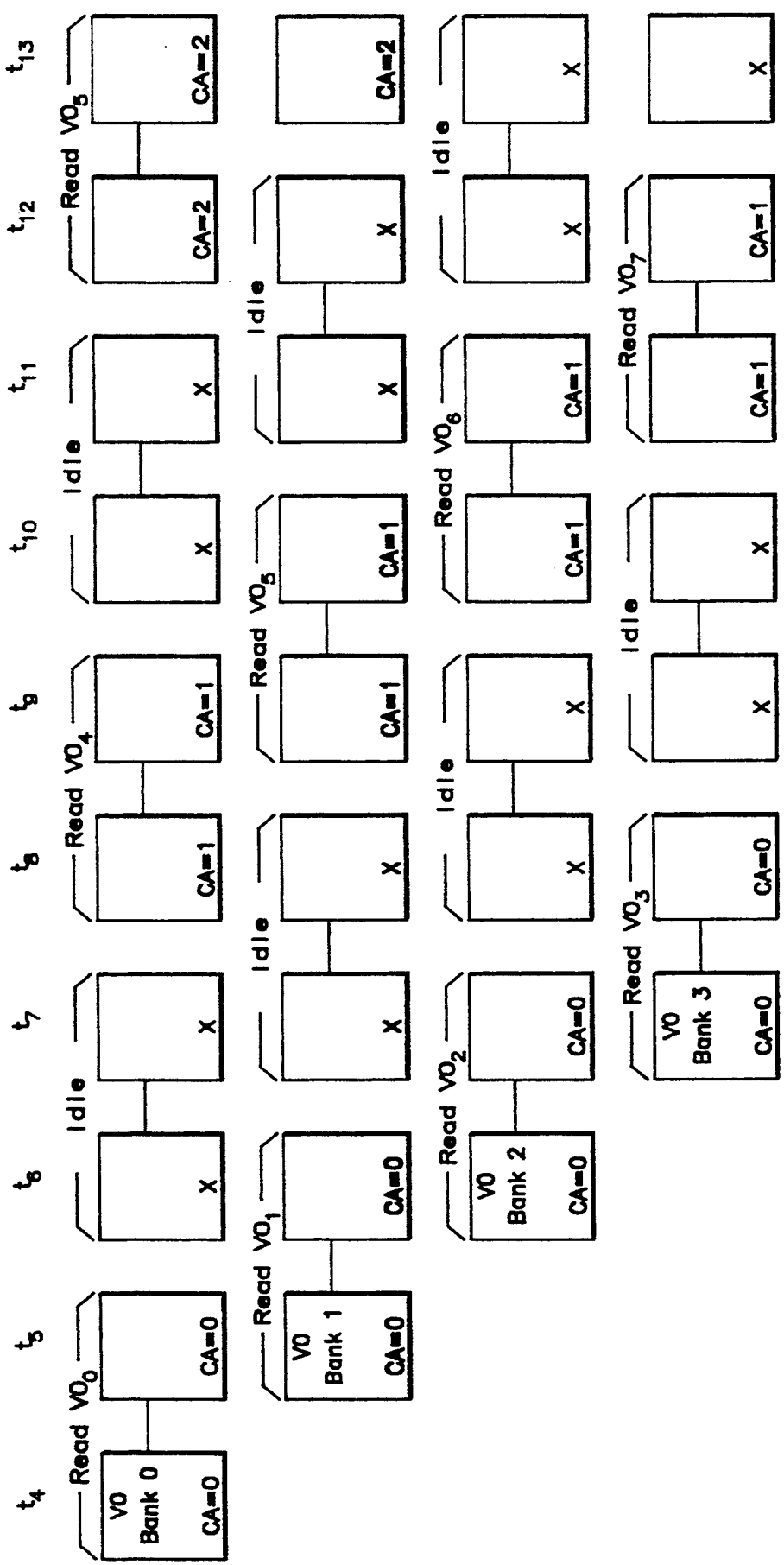
Figure 7B:
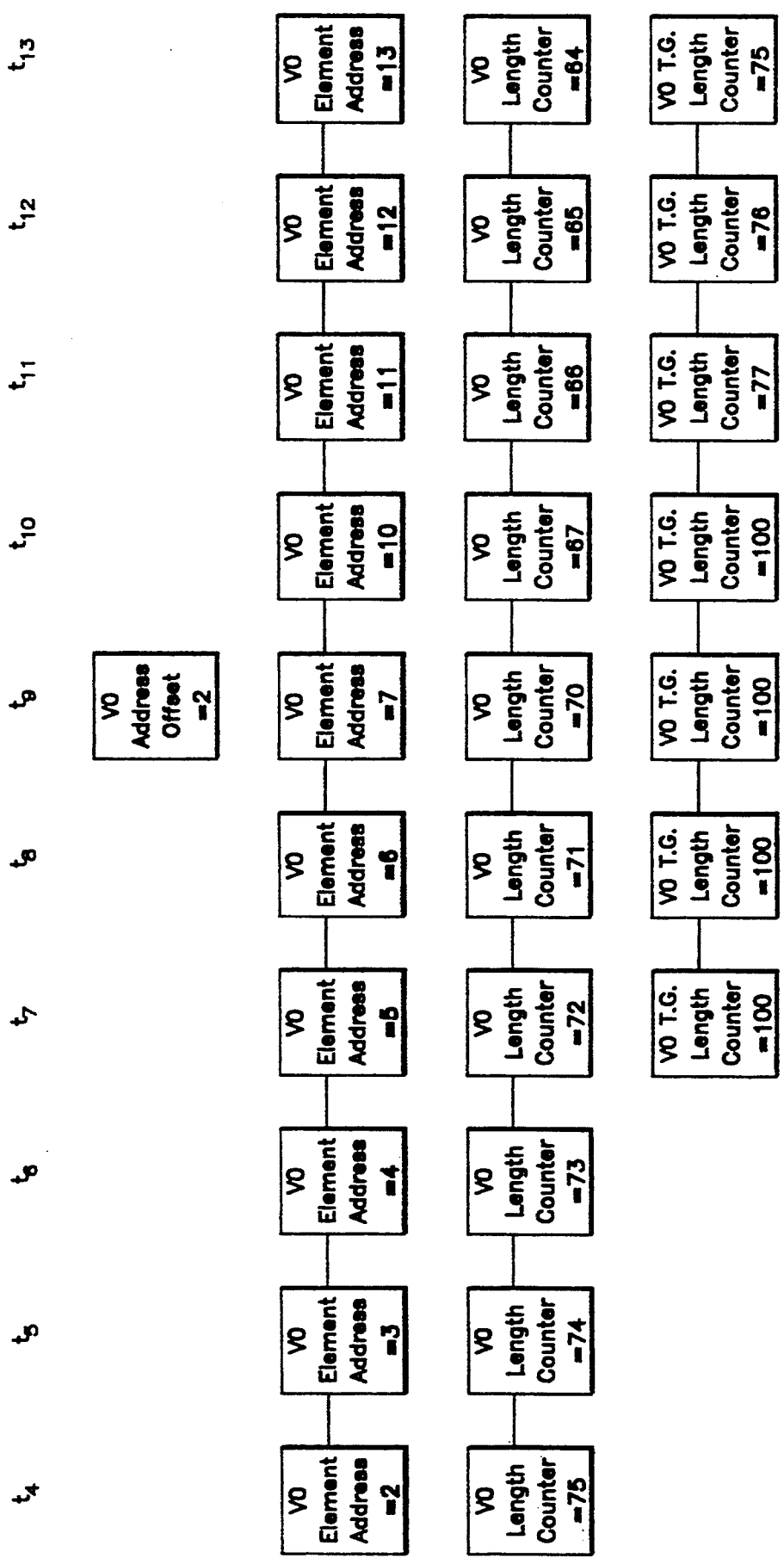

Referring now to FIGS. 7A and 7B, by time period t4 the Element Address Counter is at element address 2. In the same time period the Normal Vector Length Counter has decremented to the value 75 (octal). The upper four lines of the diagram illustrate the vector register memory operations occurring in each of the four vector register banks. During the first two time periods data is read from a vector register bank. During the next two time periods the bank is either idle or writing new data as the tailgating operation occurs. Time periods t8, t9 and t10 show that the Tailgate Vector Length Counter is held for 3 time periods before it begins to decrement. The box at time period t9, also shown in FIGS. 7A and 7B, is the V0 Address Offset. Because of propagation and fanout delays there is a period of time between the actual issuing of the adjusted offset until it is latched and held.

Figure 8A:
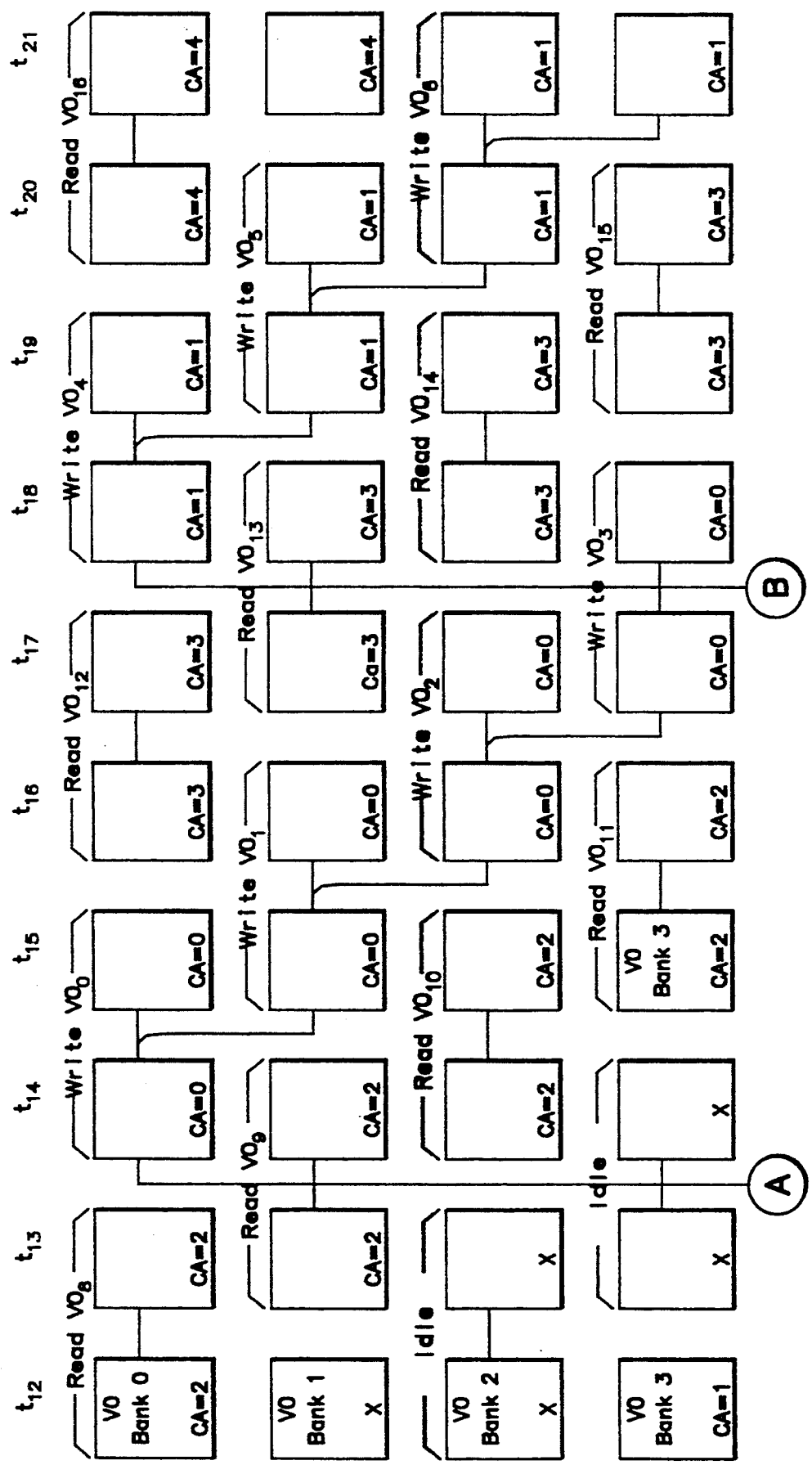
Figure 8B:
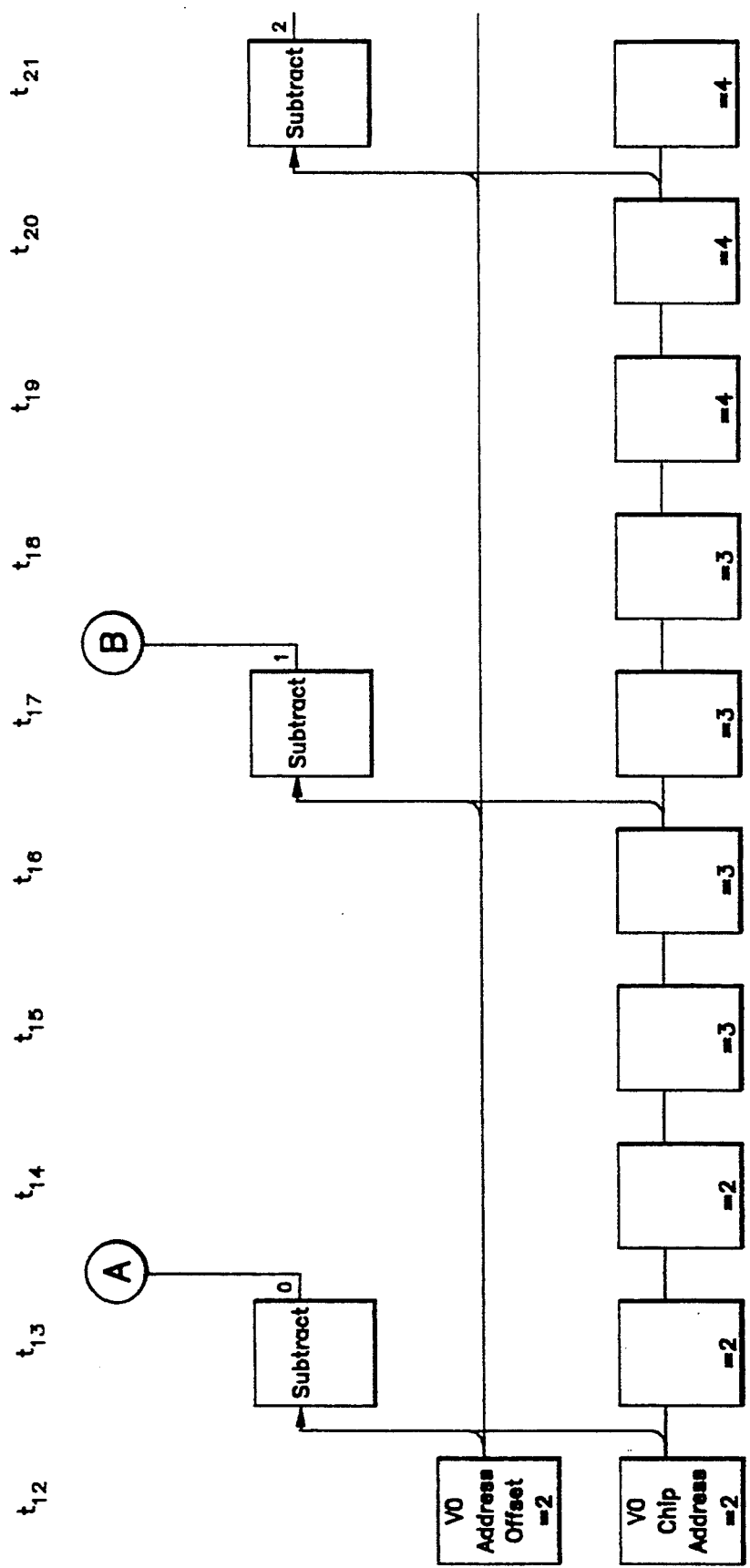

Referring now to FIGS. 8A and 8B, at time period t14, the first Write operation begins. The Subtract shown in time period t13 indicates a valid subtraction, at other times the subtraction is occurring, it is just not used. The V0 Address Offset is subtracted from the V0 Chip Address every 4 time periods to provide the correct V0 Chip Address for the subsequent Write operation. From time period t14 onward, the vector register banks are reading and writing in the same time periods, thereby illustrating the invention of tailgating. Although in this example the Read operation terminates before the Write operation, the vector lengths for the Read and the Write are completely separate so the Write operation could terminate before the Read operation.

Figure 9:
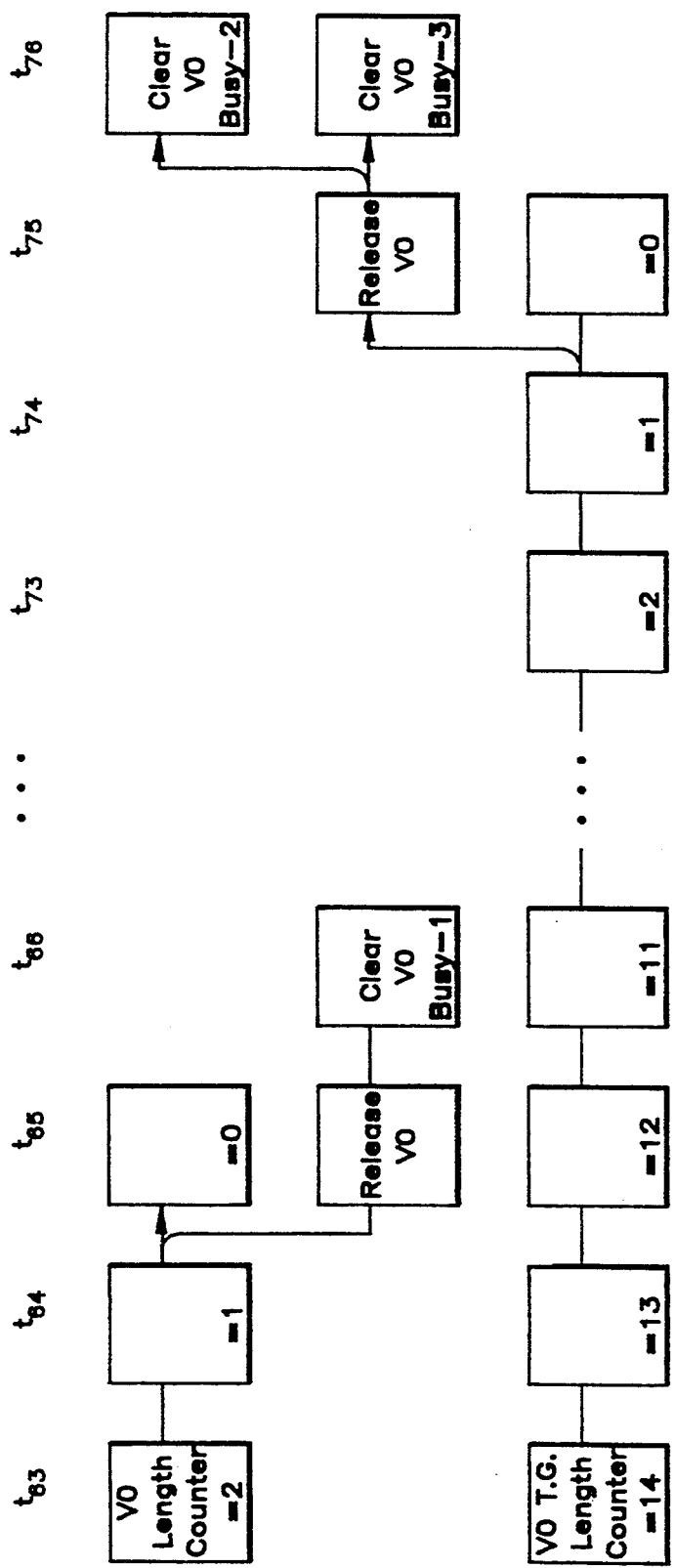

Referring now to FIG. 9, the vector register reservations are held until the last of the 2 operations is completed. Both length counters independently decrement to 0 and then transmit a Release V0 signal. The first Release signal, in this example generated by the Read operation, clears V0 Busy-1. The second Release V0 signal, in this example generated by the Write operation, clears V0 Busy-2 and V0 Busy-3.

The tailgating techniques disclosed herein provide significant improvements in processing speed for the types of calculations encountered in typical applications. Although tailgating is independent of the chaining technique disclosed in the previously mentioned U.S. Pat. No. 4,128,880, if desired, and if logic space permits, tailgating may be used in conjunction with chaining for further improvements in performance.

Although two specific configurations of computer hardware have been illustrated and described for the preferred embodiments of the present invention set forth herein, it will be appreciated by those of ordinary skill in the art that any arrangement of computer hardware which is calculated to achieve the same purpose may be substituted for the specific configurations shown. Thus, the present invention disclosed herein may be implemented through the use of different components than those disclosed in the Detailed Description. This application is intended to cover any adaptations or variations of the present invention. Therefore, it is manifestly intended that this invention be limited only by the claims and the equivalents thereof.

What is claimed is:

1. A method of processing vectors in a computer, comprising the steps of:
  (a) issuing a first instruction for operating on operands contained in a first vector register;
  (b) successively calculating first element addresses for addressing the first vector register operands, wherein said first element addresses increment sequentially;

(c) successively reading at least one operand of the first vector register according to the successively calculated first element addresses;

(d) issuing a second instruction for operating on operands contained in a second vector register, said second instruction being configured to save one or more results to said first vector register;

(e) calculating an address offset to compensate for delay time between issuance of said second instruction and generation of one of the one or more results and for elapsed time between issuance of said first and said second instructions;

(f) successively calculating second element addresses by subtracting said address offset from said first element addresses; and (g) successively storing, simultaneously with the reading of elements of said first vector register, the one or more results into said first vector register according to said successively calculated second element addresses.

2. In a vector processing computer having a plurality of vector registers which can be read and written within a same clock period, wherein the plurality of vector registers include a first and a second vector register, a method of performing vector operations comprising the steps of:

reading in successive clock periods, successive elements of both the first and the second vector registers;

performing a first mathematical function on the successive elements of said first and second vector registers to produce a first result vector, wherein said first mathematical function is performed in a first functional unit with a first functional unit time; and writing, in successive clock periods and after said first functional unit time, said first result vector to said first vector register;

wherein the step of reading comprises the step of determining a vector register address used to address elements of said vector registers; and wherein the step of writing said first result vector to said first vector register comprises:

providing a vector register address subtractor for subtracting an address offset from said vector register address to provide a vector register write address;

determining the address offset wherein the step of determining comprises:

calculating an elapsed time equivalent to time elapsed between issue of a first instruction that uses said first vector register as an operand and issue of a second instruction that uses said first vector register as a destination;

determining the first functional unit time associated with said second instruction; and expressing the address offset as a function of the elapsed time and the first functional unit time, wherein the address offset is expressed in equivalent vector register write cycles;

comparing said address offset to a vector length associated with first the instruction; and if the address offset is less than or equal to the vector length, loading said address offset into an address offset register and enabling the writing of data provided by said first functional unit to said first vector register at addresses provided by said vector register address subtractor.

3. In a vector processing computer having a plurality of vector registers which can be read and written within a same clock period, wherein the plurality of vector registers include a first and a second vector register, a method of performing vector operations comprising the steps of:

reading, in successive clock periods, successive elements of both the first and the second vector registers;

performing a first mathematical function on the elements of said first and second vector registers to produce a first result vector, wherein said first mathematical function is performed in a first functional unit with a first functional unit time; and writing, in successive clock periods and after said first functional unit time, said first result vector to said first vector register;

wherein the step of reading successive elements of said first and second vector registers comprises providing a vector register read address counter for providing a vector register address used to address elements of said vector registers during read operations; and wherein the step of writing said first result vector to said first vector register comprises:

providing a vector register write address counter for providing a vector register address used to address elements of said vector registers during write operations;

providing a vector register write delay counter for delaying a write operation to one of said vector registers;

providing a write delay equivalent to a sum of an amount of time elapsed between issue of a first instruction that uses said first vector register as an operand and issue of a second instruction that uses said first vector register as a destination and the first functional unit time associated with said second instruction, said write delay expressed in equivalent vector register write cycles;

comparing said write delay to a vector length associated with the first instruction; and if the write delay is less than or equal to the vector length loading said write delay into said write delay counter, decrementing said write delay counter by one during each first vector register write cycle and, when the write delay counter equals zero, beginning a write operation to said first vector register.

4. Vector register control apparatus for a vector processing computer in which a plurality of high-speed vector registers, including a first vector register and a second vector register, are used as intermediate memory to store ordered sets of data for vector processing by one or more functional units, wherein each said vector register comprises a plurality of memory locations for storing elements of a vector and wherein the one or more functional units includes a first functional unit connected to each of the plurality of vector registers, said first functional unit comprising input means for receiving elements of a first and second vector read from said first and second vector registers, respectively, computational means for performing a mathematical function on each said vector element in a first functional unit time, wherein the first functional unit time is greater than one clock period, and output means for delivering elements of a first result vector, the apparatus comprising:

control means, connected to said vector registers and to said one or more functional units, for transferring data between said vector registers and said one or more functional units, said control means comprising first vector control means for successively transferring elements, including a last element, read from said first vector register to said first functional unit and for successively storing elements, including a first and a last element, of said result vector to said first vector register and second vector control means for successively transferring elements, including a last element, read from said second vector register to said first functional unit and for successively storing elements, including a first and a last element, of a second result vector received from a second functional unit to said second vector register, wherein said first vector control means stores at least some of said elements of said first result vector to said first vector register concurrently with the transferring of the elements of said first and second vector registers to said first functional unit;

wherein the first vector control means comprises a first read address counter for successively addressing elements of said first vector register during a read operation, a first write address counter for successively addressing elements of said first vector register during a write operation, a first vector length counter for indicating to said first read address counter when the last element of the elements read from the first vector register has been read, a first write vector length counter for indicating to the first write address counter when the last element of said result vector has been written to said first vector register, and a first write delay counter for delaying storage to said first vector register of the first element of said first result vector for said first functional unit time and for enabling storage, in successive clock periods, of successive elements of said first result vector to said first vector register after said first functional unit time; and wherein the second vector control means comprises a second read address counter for successively addressing elements of said second vector register during a read operation, a second write address counter for successively addressing elements of said second vector register during a write operation, a second read vector length counter for indicating to said second read address counter when the last element of the elements read from the second vector register has been read, a second write vector length counter for indicating to said second write address counter when the last element of said second result vector has been written to said second vector register, and a second write delay counter for delaying storage to said second vector register of the first element of said second result vector for a second functional unit time associated with said second functional unit and for enabling storage, in successive clock periods, of successive elements of said second result vector to said second vector register after said second functional unit time.

5. Vector register control apparatus for a vector processing computer in which a plurality of high-speed vector registers, including a first vector register and a second vector register, are used as intermediate memory to store ordered sets of data for vector processing by one or more functional units, wherein each said vector register comprises a plurality of memory locations for storing elements of a vector and wherein the one or more functional units includes a first functional unit connected to each of the plurality of vector registers, said first functional unit comprising input means for successively receiving elements of a first and second vector read from said first and second vector registers, respectively, computational means for performing a mathematical function on each said vector element and output means for delivering elements of a first result vector, the apparatus comprising:

control means, connected to said vector registers and to said one or more functional units, for transferring data between said vector registers and said one or more functional units, said control means comprising first vector control means for successively transferring elements of said first vector in said first vector register and elements of said second vector in said second vector register to said first functional unit and for successively storing elements of said first result vector to said first vector register;

wherein said first vector control means comprises:

a vector register address counter for providing a vector register address used to address elements of said first and second vector registers;

a vector register address offset register for providing an offset including a number of vector register write cycles equivalent to a first functional unit time, said first functional unit time being an amount of time for the first functional unit to perform said mathematical function; and a vector register address subtractor connected to said address counter and said offset register for subtracting said offset from said vector register address to provide a vector register write address that compensates for said first functional unit time during tailgating instruction that simultaneously use the first vector register as both a source and a destination register.

6. The vector register control apparatus according to claim 5 wherein the control means further comprises a tailgating vector length counter for indicating an end of the first result vector being written during a tailgating instruction.

7. The vector register control apparatus according to claim 5 wherein the control means further comprises vector register busy means for controlling instruction issue such that no more than one read and one write operation can be active in a vector register at one time.

* * * * *